US012420894B2

(12) United States Patent
Lovric et al.

(10) Patent No.: US 12,420,894 B2
(45) Date of Patent: Sep. 23, 2025

(54) SYSTEMS AND METHODS FOR A RACK STRUCTURE FOR A TRANSPORT VESSEL ADAPTED FOR USE WITH AN OFFSHORE SELF-ELEVATING VESSEL

(71) Applicants: Friede & Goldman United B.V., Amsterdam (NL); CCCC International Holding Limited, Wanchai (HK)

(72) Inventors: Ante Lovric, Houston, TX (US); Ernest Gene Kamp, III, Katy, TX (US); Kyle Alan Littman, East Bernard, TX (US)

(73) Assignees: Friede & Goldman United B.V., Amsterdam (NL); CCCC International Holding Limited, Wanchai (HK)

( * ) Notice: Subject to any disclaimer, the term of this patent is extended or adjusted under 35 U.S.C. 154(b) by 683 days.

(21) Appl. No.: 17/733,062

(22) Filed: Apr. 29, 2022

(65) Prior Publication Data
US 2022/0355907 A1    Nov. 10, 2022

Related U.S. Application Data

(60) Provisional application No. 63/185,036, filed on May 6, 2021.

(51) Int. Cl.
*B63B 35/00* (2020.01)
*F03D 13/25* (2016.01)
(Continued)

(52) U.S. Cl.
CPC ............ *B63B 35/003* (2013.01); *F03D 13/25* (2016.05); *F03D 13/40* (2016.05);
(Continued)

(58) Field of Classification Search
CPC ....... B63B 35/00; B63B 35/003; B63B 35/44; F03D 13/00; F03D 13/25; F03D 13/40;
(Continued)

(56) References Cited

U.S. PATENT DOCUMENTS

| 3,273,527 A | 9/1966 | Goldman |
|---|---|---|
| 3,572,274 A | 3/1971 | Brauer |

(Continued)

FOREIGN PATENT DOCUMENTS

| AU | 2021381896 | 5/2023 |
|---|---|---|
| AU | 2022268885 | 11/2023 |

(Continued)

OTHER PUBLICATIONS

Hasan Bagbanci, "Dynamic Analysis of Offshore Floating Wind Turbines", Centre for Marine Technology and Engineering (CENTEC), Jan. 12, 2006, See Abstract, p. 6 and Figure 16a, Instituto Superior Tecnico Technical University of Lisbon, Lisboa, Portugal (9 pages).

(Continued)

*Primary Examiner* — Lars A Olson
(74) *Attorney, Agent, or Firm* — Clark Hill PLC

(57) ABSTRACT

A deployed L-shaped rack structure interengaged with a self-elevating vessel is used for supporting a feeder transport vessel, such as an ocean or sea barge, to eliminate relative motion or movement between the vessels. Some of the proposed rack structures are movable between a stowed position and a deployed position. The method of use for the movable rack structures includes the self-elevating vessel arriving at a predetermined location, elevating the hull of the self-elevating to a suitable height above the sea surface at a desired still water line (SWL) to create an air gap, and then deploying the rack structure. A feeder transport vessel, with its cargo and/or components, can then be floated over the deployed rack structure. The self-elevating vessel then uses (Continued)

its jacking system including a plurality of legs supported on the seabed to raise the feeder transport vessel and its cargo and/or components to a desired height above the SWL. From this position relative motion between the self-elevating vessel and transport vessel is eliminated so that the self-elevating vessel lifting device, such as a crane, can be more safely used to install energy components, such as wind turbine components. A bottom supported tower/column section could also be assembled and installed in seabed using the self-elevating vessel and rack structure along with the lifting device. A fixed rack structure system and its method can also be advantageously used with a self-elevating vessel. The systems and methods could be used in reversing the method or steps for deinstallation of the energy components installed in the sea.

64 Claims, 21 Drawing Sheets

(51) Int. Cl.
    *F03D 13/40*         (2016.01)
    *E02B 17/00*         (2006.01)

(52) U.S. Cl.
    CPC ................. *E02B 2017/0039* (2013.01); *E02B 2017/0091* (2013.01); *F05B 2240/95* (2013.01)

(58) Field of Classification Search
    CPC ..... E02B 2017/0039; E02B 2017/0091; F05B 2240/95
    USPC .......................................... 114/258; 405/196
    See application file for complete search history.

(56) References Cited

U.S. PATENT DOCUMENTS

| | | |
|---|---|---|
| 4,077,350 A | 3/1978 | Nishino et al. |
| 4,161,376 A | 7/1979 | Armstrong |
| 4,195,950 A | 4/1980 | Goldman |
| 4,269,543 A | 5/1981 | Goldman et al. |
| 4,714,375 A | 12/1987 | Stevenson et al. |
| RE32,589 E | 2/1988 | Goldman et al. |
| 4,968,181 A | 11/1990 | Goldman |
| 5,020,956 A | 6/1991 | Marsden |
| 5,092,712 A | 3/1992 | Goldman et al. |
| 5,290,128 A | 3/1994 | Yeargain et al. |
| 5,622,452 A | 4/1997 | Goldman |
| 5,921,714 A | 7/1999 | Goldman |
| 6,003,463 A | 12/1999 | Giesler |
| 6,231,269 B1 | 5/2001 | Shear et al. |
| 6,591,770 B1 | 7/2003 | Blackmore |
| 6,609,573 B1 | 8/2003 | Day |
| 6,718,901 B1 | 4/2004 | Abbott et al. |
| 6,926,097 B1 | 8/2005 | Blake |
| 7,083,004 B2 | 8/2006 | Roodenburg et al. |
| 7,156,586 B2 | 1/2007 | Nim |
| 7,213,526 B1 | 5/2007 | Hamilton |
| 7,686,543 B2 | 3/2010 | They |
| 7,735,441 B2 | 6/2010 | Borum et al. |
| 7,815,398 B2 | 10/2010 | Altman |
| 8,205,568 B2 | 6/2012 | Braun |
| 8,316,614 B2 | 11/2012 | Soe-Jensen |
| 8,471,399 B2 | 6/2013 | Lefranc |
| 8,585,325 B2 | 11/2013 | Roper |
| 8,622,011 B2 | 1/2014 | Jähnig et al. |
| 8,640,340 B2 | 2/2014 | Foo et al. |
| 8,823,198 B2 | 9/2014 | De Boer |
| 8,893,905 B2 | 11/2014 | Stührwoldt |
| 9,061,738 B2 | 6/2015 | Eriksson et al. |
| 9,080,554 B2 | 7/2015 | Royseth |
| 9,359,047 B2 | 6/2016 | Steven et al. |
| 9,410,528 B2 * | 8/2016 | Westergaard ........... F03D 13/40 |
| 9,533,738 B2 | 1/2017 | Tominaga |
| 9,643,690 B2 | 5/2017 | Hessels |
| 9,815,527 B2 | 11/2017 | Robertson et al. |
| 9,889,908 B2 | 2/2018 | Dekker et al. |
| 10,267,293 B2 | 4/2019 | Peiffer et al. |
| 10,421,524 B2 | 9/2019 | Cermelli et al. |
| 10,557,314 B2 | 2/2020 | Haavind |
| 10,569,977 B1 | 2/2020 | Hammer et al. |
| 10,569,995 B2 | 2/2020 | Roodenburg et al. |
| 10,612,323 B2 | 4/2020 | Childers et al. |
| 10,774,813 B2 | 9/2020 | Gomez et al. |
| 10,906,785 B2 | 2/2021 | Wingerden et al. |
| 10,995,464 B2 | 5/2021 | Van Loon et al. |
| 11,008,073 B2 | 5/2021 | Hammer et al. |
| 11,053,924 B2 | 7/2021 | Langeard |
| 11,136,206 B2 | 10/2021 | Hammer et al. |
| 11,142,290 B2 * | 10/2021 | Stroo ....................... F03D 13/25 |
| 11,161,571 B2 | 11/2021 | Hammer et al. |
| 11,168,666 B1 * | 11/2021 | van Loon ............. B63B 35/003 |
| 11,795,647 B2 * | 10/2023 | Oltmann ................... B63C 7/06 |
| 11,975,804 B2 | 5/2024 | Oltmann |
| 2006/0120809 A1 | 6/2006 | Ingram et al. |
| 2009/0217852 A1 | 9/2009 | Zaman |
| 2010/0067989 A1 | 3/2010 | Brown et al. |
| 2010/0293781 A1 | 11/2010 | Foo et al. |
| 2010/0316450 A1 | 12/2010 | Botwright |
| 2011/0292760 A1 | 12/2011 | Hayes |
| 2011/0311360 A1 | 12/2011 | Nedrebø |
| 2012/0141233 A1 | 6/2012 | Mueller |
| 2012/0255478 A1 | 10/2012 | Hadeler et al. |
| 2014/0366792 A1 | 12/2014 | Steven et al. |
| 2019/0345011 A1 | 11/2019 | Van Wingerden et al. |
| 2020/0200150 A1 | 6/2020 | Langeard |
| 2021/0017727 A1 | 1/2021 | Van Loon et al. |
| 2021/0047006 A1 | 2/2021 | Oltmann |
| 2021/0371219 A1 | 12/2021 | Phoenix, II |
| 2022/0154695 A1 | 5/2022 | Clague et al. |
| 2022/0259811 A1 | 8/2022 | Van Loon et al. |
| 2022/0355907 A1 | 11/2022 | Lovric et al. |

FOREIGN PATENT DOCUMENTS

| | | |
|---|---|---|
| CN | 105460796 A | 4/2016 |
| CN | 107738730 A | 2/2018 |
| CN | 209492672 U | 10/2019 |
| CN | 110886684 A | 3/2020 |
| CN | 116457571 A | 7/2023 |
| CN | 117242223 A | 12/2023 |
| DE | 3224976 A1 | 1/1984 |
| DE | 29908897 U1 | 8/1999 |
| DE | 10306225 A1 | 9/2004 |
| DE | 202009006507 U1 | 8/2009 |
| DE | 202009007141 U1 | 8/2009 |
| DE | 102010040887 A1 | 3/2012 |
| DE | 102018105545 A1 | 9/2019 |
| DK | 2931978 T3 | 5/2017 |
| EP | 0761964 A1 | 3/1997 |
| EP | 1169570 B1 | 1/2002 |
| EP | 4248089 | 9/2003 |
| EP | 1876093 A1 | 1/2008 |
| EP | 2602177 A1 | 6/2013 |
| EP | 2641825 B1 | 3/2016 |
| EP | 2931978 B8 | 2/2017 |
| EP | 3388664 A1 | 10/2018 |
| EP | 3575199 B1 | 12/2019 |
| EP | 3693515 A1 | 8/2020 |
| EP | 4334535 | 3/2024 |
| FR | 2760229 A1 | 9/1998 |
| FR | 3072643 A1 | 4/2019 |
| GB | 2365905 B | 5/2003 |
| GB | 2402109 A | 12/2004 |
| JP | 20022418436 A | 8/2004 |
| JP | 2023549580 | 11/2023 |
| JP | 2024517828 | 4/2024 |
| KR | 101315154 B1 | 10/2013 |
| KR | 101444326 B1 | 4/2014 |
| KR | 20150021657 A | 3/2015 |
| KR | 101556194 B1 | 5/2015 |
| KR | 101774854 B1 | 9/2017 |

(56) References Cited

FOREIGN PATENT DOCUMENTS

| | | |
|---|---|---|
| KR | 101864144 B1 | 9/2017 |
| KR | 101864145 B1 | 9/2017 |
| KR | 20170107628 A | 9/2017 |
| KR | 102134996 B1 | 7/2020 |
| KR | 1020230106684 | 7/2023 |
| KR | 1020240004955 | 1/2024 |
| NL | 1042866 B1 | 11/2019 |
| NL | 2021025 B1 | 12/2019 |
| NL | 2022553 B1 | 8/2020 |
| NL | 2031544 B1 | 11/2023 |
| NL | 2033624 B1 | 6/2024 |
| NL | 2034330 B1 | 9/2024 |
| NL | 2034761 B1 | 11/2024 |
| NL | 2035480 B1 | 2/2025 |
| VN | 98491 A | 10/2023 |
| VN | 1202307210 | 10/2023 |
| WO | WO 02073032 A1 | 9/2002 |
| WO | WO 2002088475 A1 | 11/2002 |
| WO | WO 2003093584 A1 | 11/2003 |
| WO | WO 2007009464 A1 | 1/2007 |
| WO | WO 2010026555 A2 | 3/2010 |
| WO | WO 2011065840 A2 | 6/2011 |
| WO | WO 2012039619 A2 | 3/2012 |
| WO | WO 2012060112 A1 | 5/2012 |
| WO | WO 2012066789 A1 | 5/2012 |
| WO | WO 2014019920 A1 | 2/2014 |
| WO | 2014092555 A1 | 6/2014 |
| WO | WO 2015088333 A1 | 6/2015 |
| WO | WO 2016209720 A1 | 12/2016 |
| WO | WO 2017141177 A1 | 8/2017 |
| WO | WO 2019102434 A1 | 5/2019 |
| WO | WO 2019103611 A2 | 5/2019 |
| WO | WO 2019143282 A1 | 7/2019 |
| WO | WO 2019241125 A1 | 12/2019 |
| WO | WO2019245366 A1 | 12/2019 |
| WO | WO 2020085902 A1 | 4/2020 |
| WO | WO 2020167137 A1 | 8/2020 |
| WO | WO 2022108889 A1 | 5/2022 |
| WO | WO 2022108889 A8 | 5/2022 |
| WO | WO 2022235508 A2 | 11/2022 |
| WO | WO 2022235508 A3 | 11/2022 |
| WO | WO 2023195855 A1 | 10/2023 |
| WO | 2024189076 A1 | 9/2024 |
| WO | 2025021954 A1 | 1/2025 |

OTHER PUBLICATIONS

Emily Balogh, "Deepwater Offshore Wind Power Generation Using Oil and Gas Platform Technology", Dec. 18, 2008, See p. 1, Renewable Energy World.com, https://www.renewableenergyworld.com/baseload/deepwater-offshore-wind-power-generation-using-oil-and-gas-platform-technology-54314/#gref (6 pages).

G.R. Fulton, D.J. Malcolm, H. Elwany, W. Stewart, E. Moroz, and H. Dempster, "Semi-Submersible Platform and Anchor Foundation Systems for Wind Turbine Support", p. 2 and Figures 1-2, National Renewable Energy Laboratory (NREL), Concept Marine Associates Inc., www.nrel.gov/docs/fy08osti/40282.pdf, Long Beach, California (141 pages).

F. Sevilla, R. Redfern, A. Storey, N. Baldock, "Optimization of Installation, Operation and Maintenance at Offshore Wind Projects in the U.S.", Dec. 19, 2014, See p. 60 and Table 3-3, Garrad Hassan, www.osti.gov/servlets/purl/1333103 (305 pages).

"Offshore Wind Installation", Oct. 12, 2020, See p. 4 and Figures 1 and 2, Van Oord Marine Ingenuity, www.vanoord.com/activities/offshore-woind-equipment (7 pages).

"From Oil and Gass to Offshore Wind", May 2, 2019, See p. 12 and Figure 1, Ulstein, www.ulstein.com/blog/2019/getting-the-best-from-oil-and-gas-to-offshore-renewables (17 pages).

"Scientists Race to Develop Floating Wind Farms", Jan. 23, 2013, See Paragraphs 1-3 and Figure 2, Deutsche Welle, https://www.dw.com/en/scientists-race-to-develop-floating-wind-farms/a-16540081 (3 pages).

Elize De Vries, "Twin rotors bring 15MW offshore turbine closer", May 30, 2017, See Paragraphs 1-5 and Figure 1, Wind Power Monthly, https://www.windpowermonthly.com/article/1434240/twin-rotors-bring-15mw-offshore-turbine-closer (13 pages).

Elaine Maslin, "Bigger, Bolder, Heavier", Jun. 17, 2019, See p. 8, Offshore Engineer, https://www.oedigital.com/news/467364-bigger-bolder-heavier (10 pages).

PCT Notification of Transmittal of the International Search Report mailed Mar. 11, 2022 issued to corresponding PCT Application No. PCT/US2021/059437 (our matter No. 432218WO); (5 pages).

PCT Notification of Transmittal of the Written Opinion mailed Mar. 11, 2022 issued to corresponding PCT Application No. PCT/US2021/059437 (our matter No. 432218WO); (8 pages).

U.S. Department of Homeland Security / U.S. Customs and Boarder Protection Feb. 4, 2021 decision about Coastwise Transportation; Outer Continental Shelf; Wind Turbines; 46 U.S.C. §§ 55102 and 55103; 19 CFR §§ 4.80a and 4.80b; 43 U.S.C. § 1333; Disclosed in the Background of the Invention for U.S. Appl. No. 17/733,062, U.S. Appl. No. 17/733,062, and PCT Publication No. WO 2022/235508 A1 all cited herein (7 pages).

"Keppel to Build Wind Turbine Installation Vessel in the U.S. Worth About S$600m"; www.kepcorp.com; Disclosed in the Background of the Invention for U.S. Appl. No. 17/733,062, U.S. Appl. No. 17/733,062, and PCT Publication No. WO 2022/235508 A1 all cited herein. Dec. 17, 2020; (2 pages).

PCT Notification of Transmittal of the International Search Report mailed Jan. 12, 2023 issued to corresponding PCT Application No. PCT/US2022/026956 (our matter No. 440641WO); (8 pages).

PCT Notification of Transmittal of the Written Opinion mailed Jan. 12, 2023 issued to corresponding PCT Application No. PCT/US202/026956 (our matter No. 432218WO); (15 pages).

Mike Schuler, "Keel Laid for First Jones Act-Compliant Offshore Wind Installation Vessel", Dec. 16, 2020, GCaptain, https://gcaptain.com/keel-laid-for-first-jones-act-compliant-offshore-wind-installation-vessel/ (5 pages).

"Keppel to build vessel in US worth $600m; more bondholders accede to Floatel lock-up", Dec. 17, 2020, The Straits Times, https://www.straitstimes.com/business/companies-markets/keppel-to-build-vessel-in-us-worth-600m-more-bondholders-accede-to (4 pages).

"Keel laying first Jones Act compliant offshore wind turbine installation vessel", Dec. 17, 2020, Ocean Energy Resources International, https://ocean-energyresources.com/2020/12/17/keel-laying-first-jones-act-compliant-offshore-wind-turbine-installation-vessel/ (3 pages).

Roy Tran, "Keppel to build wind turbine installation vessel in the U.S. worth about S$600m", Dec. 17, 2020, Keppel Ltd., https://www.keppel.com/en/media/media- releases-sgx-filings/keppel-to-build-wind-turbine-installation-vessel-in-the-us-worth-about-s600m/ (3 pages).

Adnan Memija, "US Company Reveals Jones Act-Compliant Offshore Wind Farm Installation Solution", Jul. 5, 2022, OffshoreWIND.biz, https://www.offshorewind.biz/2022/07/05/US-company-reveals-jones-act-compliant-offshore- wind-farm-installation-solution/ (.

Adnan Memija, "C-Job Design for Bleutec Foundation Installation Vessel", Aug. 31, 2022, OffshoreWIND.biz, https://www.offshorewind.biz/2022/08/31/c-job-design-for-bleutec-foundation-installation-vessel/ (3 pages).

"Belutec Industries Develops ""Can-Do"" Solution for US Offshore Wind—Integrated Transportation and Installation, Commissioning and Operations & Maintenance Solution", Jul. 5, 2022, WorkBoat 365.

Mike Schuler, "Bleutec Advances Plans for Jones Act-Compliant Offshore Wind Turbine Installation Concept", Dec. 1, 2022, GCaptain, https://gcaptain.com/bluetec-advances-plans-for-jones-act-compliant-platform-for-offshore-wind-turbine-installation/ (5 pages).

European Patent Office Communication pursuant to Rules 161(1) and 162 EPC dated Jun. 27, 2023 issued to corresponding European Application No. 21824180.0 (our matter No. 462153EP) (3 pages).

Response to European Patent Office Communication pursuant to Rules 161(1) and 162 EPC filed Jan. 8, 2024 to corresponding European Application No. 21824180.0 (our matter No. 462153EP) (41 pages).

(56) References Cited

OTHER PUBLICATIONS

European Patent Office Communication pursuant to Rules 161(1) and 162 EPC dated Dec. 13, 2023 issued to corresponding European Application No. 22724340.9 (our matter No. 471032EP) (3 pages).
United States Customs Service, U.S. Department of Homeland Security, RE: Coastwise Transportation; Hq H309672 (Customs), 2020 WL 4583530, Wind Turbines; 46 U.S.C. §55102; 46 U.S.C. §55103; 19 C.F.R. §4.80a; 19 C.F.R. §4.80b., Disclosed in the Background of the Invention for U.S. Appl. No. 17/733,062, U.S. Appl. No. 17/733,062, and PCT Publication No. WO 2022/235508 A1 all cited herein, Jul. 15, 2020 (5 pages).
United States Customs Service, U.S. Department of Homeland Security, RE: Revocation of Ruling Letter Hq H309672 (Jul. 15, 2020), Hq H312773 (Customs), 2020 WL 4783788, VES-3-02-OT:RR:BSTC:CCR H312773 AMW, Aug. 3, 2020, Disclosed in the Background of the Invention for U.S. Appl. No. 17/733,062, U.S. Appl. No. 17/733,062, and PCT Publication No. WO 2022/235508 A1 all cited herein (1 page).
Mike Robinson, Walt Musial, National Wind Technology Center, National Renewable Energy Laboratory, "Offshore Wind Technology Overview", U.S. Department of Energy—Energy Efficiency and Renewable Energy, Oct. 2006, (24 pages).
W. Musial, S. Butterfield, and A. Boone, "Feasibility of Floating Platform Systems for Wind Turbines", National Renewable Energy Laboratory, Conference Paper to be presented at the 23rd ASME Wind Energy Symposium, Reno, Nevada, Jan. 5-8, 2004, (14 pages).
N. Barltrop, "Multiple Unit Floating Offshore Wind Farm (MUFOW)", Paper presented at the BWEA/DTI/Multi-Science Workshop on Offshore Wind Energy, Harwell, Jun. 1993, (6 pages).
EnerOcean webpage for W2Power, www.enerocean.com/w2power/ captured May 23, 2024 (3 pages).
Response to European Patent Office Communication pursuant to Rules 161(1) and 162 EPC filed Jun. 13, 2024 to corresponding European Application No. 22724340.9 (our matter No. 471032EP) (27 pages).
Svein B. Hellesmark and Per Gunnar Andersen, HiLoad Lng As; Tord Broms Thorsen, Sevan Marine Asa, "Development and Qualification of a Tandem FLNG Loading Terminal for Conventional LNG Carriers", Offshore Technology Conference, Houston, Texas, OTC-25980-MS, May 4-7, 2015, Copyright 2015, In particular, see numbered pp. 9, 10, 16, and 24 and Figures 2, 7, and 19 (24 pages).
M. Cahay, S. Paquet, E. Auburtin, and B. A. Roberts, Technip; Captain F. Olsen, Teekay, T.B. Thorsen, Sevan-Marine, P.B. Korneliussen, Kongsberg, A. Voogt, Marin, "Operational Simulations of Safe LNG Offloading to Conventional LNG Carriers in Severe Open Sea Environments", Offshore Technology Conference, Houston, Texas, OTC-27119-MS, May 2-5, 2016, Copyright 2016, In particular, see numbered pp. 4 and 5 and Figure 2 (17 pages).
Temporary Works Design "TWD", capture of TWD's Post on Linkedin that states to be from 2 weeks ago when captured on Apr. 23, 2025 at: https://www.linkedin.com/posts/temporary-works-design_offshoreinnovation-offshorewind-windeurope2025-activity-7313837699306582017-_IMY?utm_source=share&utm_mediumsmember_desktop&rom=ACoAAAF6IVABon1_MZOgKkP2kRcJe.JxWE0ZGGbl about the "Motion-Compensated Lifting Tool" containing a video of concept (3 pages).
Written Request for Substantive Examination with Voluntary Amendments to the Claims filed with the Korean Intellectual Property Office "KIPO" on Apr. 25, 2025 to corresponding Korean Application No, 10-2023-7041824 (49 pages).
Written Request for Substantive Examination with Voluntary Amendments to the Claims filed with the Japan Patent Office on Apr. 28, 2025 to corresponding Japanese Application No. 2023-568003 (66 pages).

\* cited by examiner

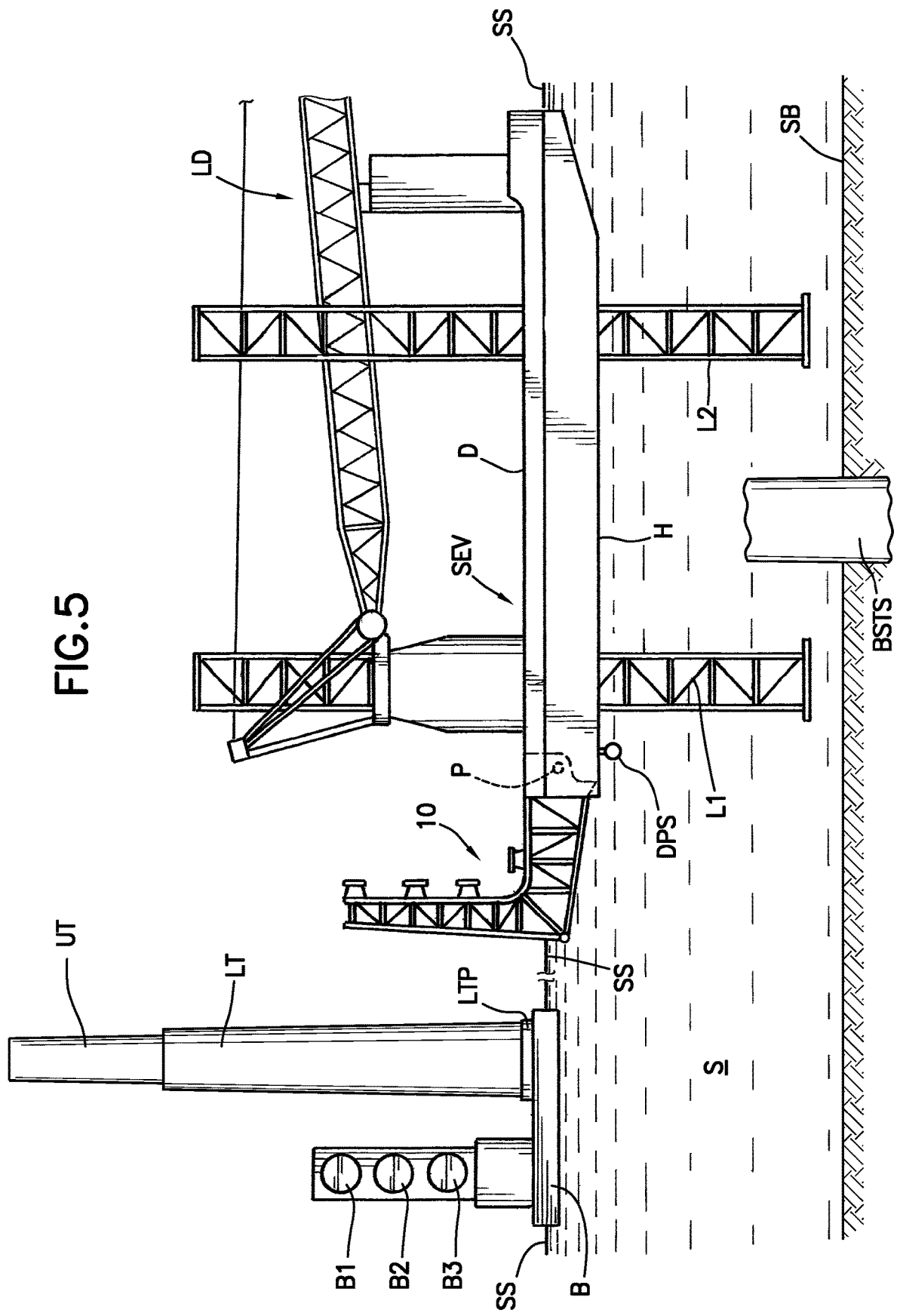

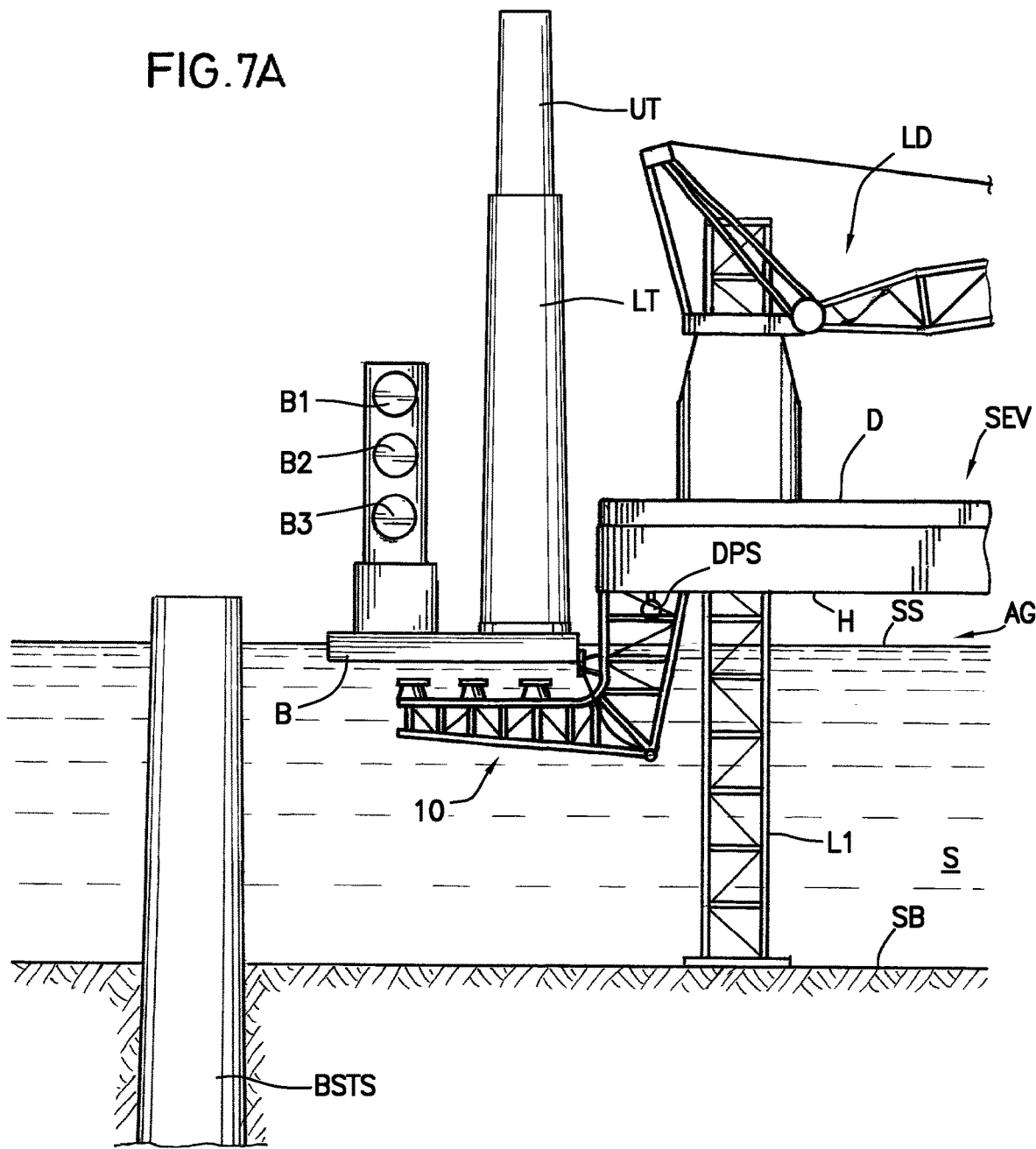

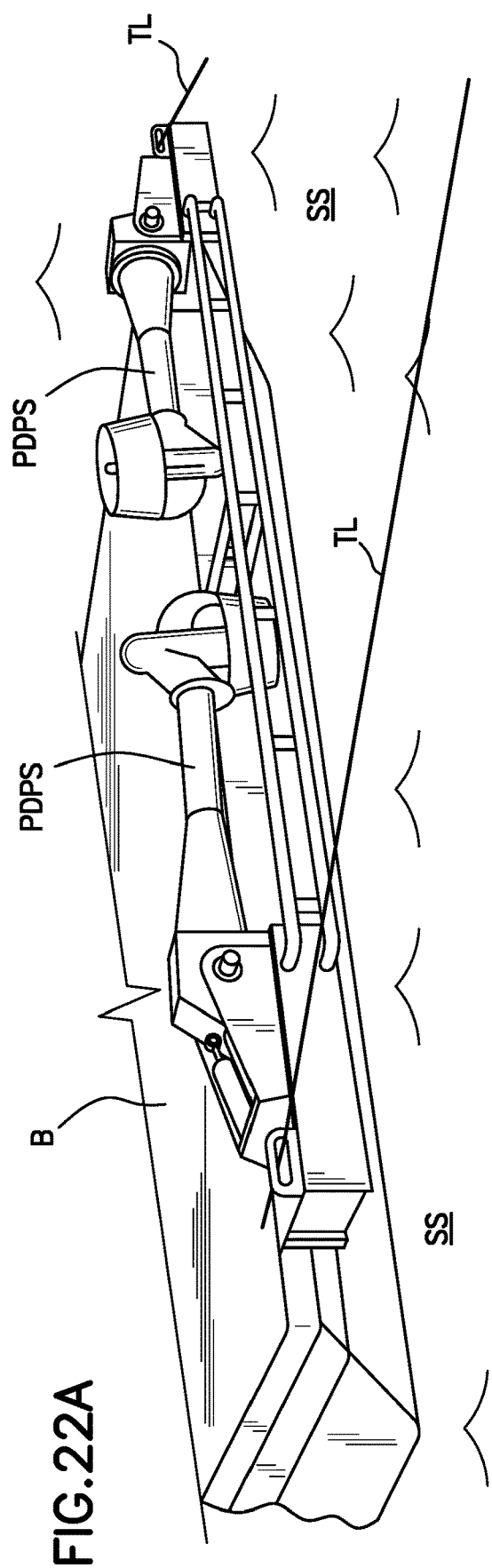
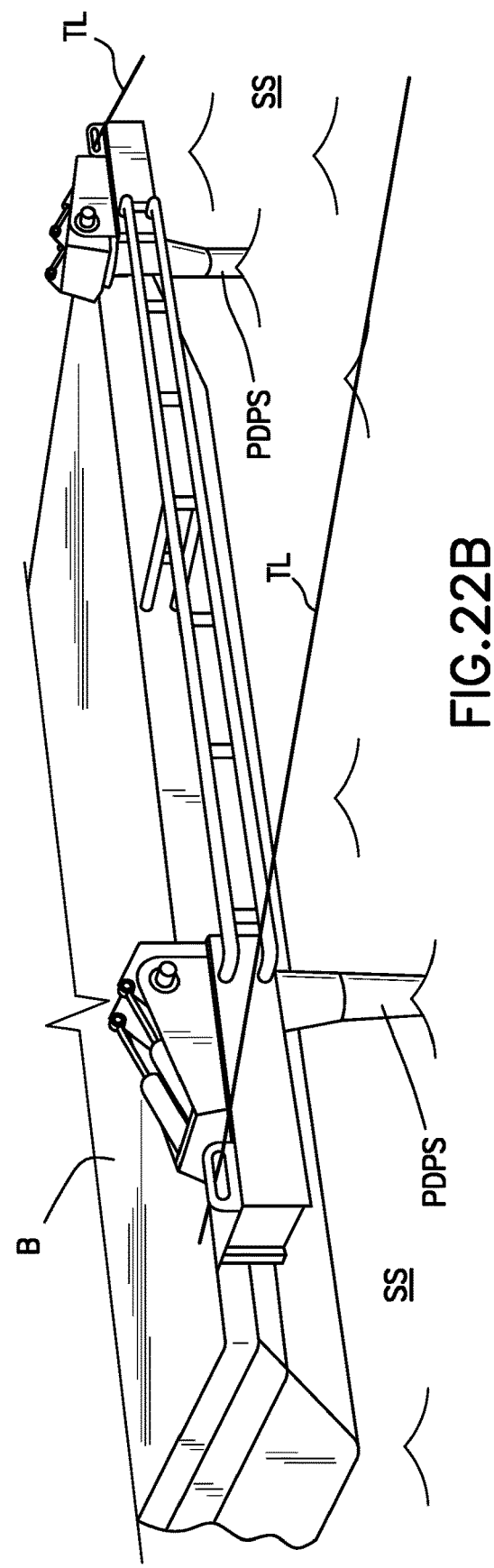
FIG.22A
FIG.22B

SYSTEMS AND METHODS FOR A RACK STRUCTURE FOR A TRANSPORT VESSEL ADAPTED FOR USE WITH AN OFFSHORE SELF-ELEVATING VESSEL

This application claims the benefit of U.S. Provisional Application No. 63/185,036 filed May 6, 2021, which application is hereby incorporated by reference herein for all purposes in its entirety.

BACKGROUND OF THE INVENTION

1. Field of the Invention

The present invention relates to systems and methods for a rack structure for a feeder transport vessel adapted for use with an offshore self-elevating vessel. In particular, the present invention relates to systems and methods for installing offshore energy cargo and/or components, including wind turbine components, from a feeder transport vessel to an offshore self-elevating vessel, such as a jack-up.

2. Description of the Related Art

Offshore wind in the United States is moving forward, thanks in large part to a number of positive developments for the newly emerging industry over the last year or so. For one, the Biden administration at the start of 2021 revealed its aim to have 30 gigawatts (GW) of offshore wind power in development by 2030 and 110 GW by 2050. It will take a large number of offshore vessels to reach these targets, including both U.S. and foreign-flagged vessels.

While the Jones Act applies to U.S. offshore wind, it is expected that the emerging industry will rely mostly on foreign-flagged wind turbine installation vessels (WTIV) working in combination with a fleet of American-built and -crewed feeder transport barges, or even specially designed ship-shaped feeder transport vessels, that will transport wind turbine components from the U.S. mainland dockside for installation offshore.

U.S. Pat. Nos. 10,569,977B1; 11,0 08,073B2; 11,136,206B2 and 11,161,571B2 and U.S. Patent Publication No. U.S. 2021/371219A1 (the "Phoenix II U.S. Patents"), all transferred to and now owned by Phoenix II A/S of Copenhagen, Denmark, propose a coastwise—qualified vessel, such as a barge, for transporting wind turbine components between mainland dockside and a foreign-flagged offshore jack-up. Maersk Supply Services A/S, who previously owned the Phoenix II U.S. Patents, received decision H316313 dated Feb. 4, 2021 from the U.S. Department of Homeland Security/U.S. Customs and Border Protection for a similar feeder transport vessel protocol as generally proposed in the Phoenix II U.S. Patents, that held that the proposed feeder transport vessel protocol would not be a violation of the Jones Act (46 U.S.C. §§ 55102 and 55103). Since all of the Phoenix II U.S. Patents claim priority to one of the 2 Danish patent applications filed by Maersk Supply Services A/S on Apr. 1, 2019, the Phoenix II U.S. Patents propose a method for a wind turbine components feeder transport vessel protocol that may not violate with the U.S. Jones Act.

For example, U.S. Pat. No. 10,569,977 proposes a system and method for securing and transferring a load between a feeder transport vessel and an offshore installation, such as a jack-up. The proposed offshore jack-up has a hull and a plurality of moveable legs engageable with the seabed. The proposed offshore jack-up is arranged to move its legs with respect to the hull to position the hull out of the water. The proposed method comprises moving at least a portion of a feeder transport vessel underneath the hull of the offshore jack-up or within a cut-out of the jack-up hull when the hull is positioned out of the water with the legs engaging the seabed. A stabilizing mechanism is also proposed to be mounted on the jack-up to be engaged against the feeder transport vessel to be pushed down on the feeder transport vessel to increase the buoyant force acting on the vessel. Generally, the Phoenix II U.S. patents and Publication propose the following:

1.) systems and methods of pushing down on the feeder transport vessel/barge to limit movement of the vessel with respect to the hull of the offshore jack-up by increasing the buoyant force on the vessel/barge, and
2.) systems and methods for a platform base to engage with the wind turbine components, where the platform base is releasably secured to the feeder transport vessel/barge so that the platform base can be lifted between the vessel/barge and a position clear of the vessel/barge.

Using the proposed Phoenix II feeder transport vessel protocol enables a foreign-flagged non-U.S. Jones Act compliant installation offshore jack-up to install wind turbines—as long as the jack-up is not part of the transportation chain. Therefore, the proposed Phoenix II feeder transport vessel protocol reduces capital expenditure as the jack-up can be built outside of the U.S. for a lower cost. A recent U.S. Jones Act compliant offshore jack-up, the Dominion Energy's Charybdis, built in the U.S. is estimated to have cost over $600 million U.S.D.

Friede & Goldman, LLC d/b/a Friede & Goldman, Ltd. (Friede & Goldman), marine engineers and naval architects, have designed and developed offshore self-elevating vessels including jack-ups for over 40 years. Some of Friede & Goldman's or its predecessor, related or affiliated entities, such as its parent Friede & Goldman United B.V., U.S. Patents relate to offshore jack-ups. For example, see U.S. Pat. Nos. 4,195,590; 4,269,543 and its reissue U.S. Pat. Nos. Re. 32,589; 4,968,181; 5,092,712; 5,622,452; 5,921,714; 6,231,269B1 and 6,609,573B1.

Other examples of systems and methods proposed for use in the offshore industry are discussed below.

U.S. Pat. No. 5,020,956 proposes a system and method for an open hopper barge unloading system. A floating barge unloader system is proposed by which open hopper barges containing granular materials are unloaded by picking up, rotating the barge and dumping its contents. Generally, in column 3, lines 9 to 25, the '956 patent proposes a floating barge lifting platform 1 in its initial lowered or sunken position (FIG. 2). The '956 patent then proposes in column 3, line 54 to column 4, line 27 that the floating support structure 11 is outfitted with rotating arms 6A, 6B (FIGS. 2 and 2A) which attach to the floating barge lifting platform 1 to impart an upsetting force to the floating barge lifting platform 1.

U.S. Patent Publication No. 2021/0017727 proposes a jack-up platform comprising a mooring system and a method for mooring a floating vessel. A jack-up platform is proposed for having a horizontal working deck that may be jacked up out of the water by moving its legs to the seabed. The jack-up platform further comprises a mooring system for mooring a floating vessel at a mooring side of the jack-up platform. A method for mooring a floating vessel using the jack-up platform is also proposed.

U.S. Patent Publication No. 2021/0047006 proposes an offshore platform comprising a deck and a docking device and a method for transferring personnel. An offshore platform device comprising a platform and a docking device, which has a vertically oriented longitudinal axis (L), is proposed to be raised along its longitudinal axis (L) relative to the platform (3) into a transport position that can be lowered to an operational position.

U.S. Pat. No. 3,273,527 proposes a system and a method for an integrated barge and cargo ship. An integrated barge and cargo ship construction is proposed to divide the ship into a plurality of cargo receiving holds from forward to aft.

U.S. Pat. No. 4,077,350 proposes a system and a method for a barge-carrying ship having an opening at one end with an elevator for lifting barges from the water surface.

U.S. Pat. No. 6,591,770 proposes a system and a method for a boat lift for attachment to the transom of a larger boat for lifting and lowering smaller water craft. The '770 patent further proposes in column 2, line 66 to column 3, line 11 (FIG. 1) that the boat lift 10 is carried on the stern transom 11 at the aft of a boat 12 substantially above the water line 13. The boat lift is proposed to include generally horizontally extending support arms 15 which extend an of the boat 12. The '770 patent further proposes in column 3, lines 13 to 28 that in addition to the support posts 16, the boat lift 10 includes a horizontal top member 20 having depending vertical legs 21 and 22 adjacent each end of the horizontal member 20. Thus, as shown in the '770 patent FIG. 2, the support arms 15 are proposed to be lowered to a position substantially below the water line 13 or, as shown in FIG. 1, raised to a position substantially above the water line.

U.S. Pat. No. 3,572,274 proposes a system and a method for a barge carrier vessel wherein two rearwardly extending stern beams support an inflatable pontoon for lifting or lowering of barges. The pontoon is proposed to be movable between loading and stowed positions by seaway compensating winches or cylinders. A portal crane is also proposed to be mounted on the deck for movement lengthwise of the hull to feeder transport barges onto and from the pontoon when the latter is held in the stowed position. The '274 patent further proposes in column 4, lines 23 to 69 that a barge which floats in the water at the open rear side of the pontoon 21 is maneuvered so that one of its longer sides is adjacent to the open rear side. The pontoon is proposed to be held in its loading position and is submerged (flooded) to enable a tug, tractor or other suitable manipulating machine or craft to pull or push the barge into the loading zone above the submerged pontoon 21. A crane 10 is also proposed to lift the barge off the pontoon 21 and to move it forwardly (lengthwise of the deck 6) and to stow it on board of ship. The pontoon 21 is then proposed to be free to descend and to pick up another barge.

German Patent No. DE202009007141 U1 proposes a system and method for a watercraft with a platform lift. Watercraft (1) with a hull (2) is proposed which has at least one walkable deck (3) and a platform lift (4) for attachment to the stern (2.1) of the fuselage (2). Platform (5), which by means of a power-driven lifting device (6), is proposed to move between a deck area loading position (3.1) and an unloading position (L2). The German '141 Patent further proposes in paragraphs 0030 to 0031 that the platform 5 moves between the transport position, in which the walk-in surface 5.1 is on a same horizontal plane as the walk-on deck surface 3.2, and the position L2 shown in the '141 patent FIG. 4.

All of the references cited herein including U.S. Pat. Nos. 3,273,527; 3,572,274; 4,077,350; 4,195,590; 4,269,543 and its reissue U.S. Pat. Nos. Re. 32,589; 4,968,181; 5,020,956; 5,092,712; 5,622,452; 5,921,714; 6,231,269B1; 6,591,770; 6,609,573B1; 10,569,977B1; 11,008,073B2; 11,136,206B2 and 11,161,571B2; and U.S. Patent Publication Nos. 2021/0017727; 2021/0047006 and 2021/371219A1 along with German Patent No. DE202009007141U1 are incorporated by reference herein for all purposes in their entirety.

As can now be understood, the offshore industry's systems and methods for installing energy cargo and/or components, such as wind turbine components, via feeder transport vessels are limited. Besides those systems and methods described above, others have proposed a barge mooring alongside a self-elevating vessel and/or using a second self-elevating vessel as a feeder transport vessel.

A foreign-flagged non-U.S. Jones Act compliant installation offshore jack-up for use with a Jones Act compliant feeder transport vessel/barge system and method is desired in the wind turbine installation industry where relative movement between the jack-up, fixed on the seabed, and the barge is completely eliminated. With the barge motion completely eliminated relative to the fixed jack-up, the cargo and components, including wind turbine components, can be safely moved by a lifting device on the jack-up to a position clear of the barge. Superior operations are also desired by the wind turbine installation industry operator of the feeder transport vessel protocol including lifting operations that are safe and simple. Increased uptime/extended operations window/reduced time waiting on weather are also desired by the wind turbine installation industry operator. Elimination of expensive and complicated motion compensating systems and methods including gangways are also desired. Also, a more cost-effective feeder transport vessel protocol that does not require expensive customized jack-up type feeder transport vessels/barges or customized feeder transport vessels/barges with motion compensating equipment is desired. It is further desirable in the wind turbine installation industry to use the existing U.S. ocean barge fleet, that is U.S. Jones Act compliant, thereby eliminating requirements for additional and/or custom feeder transport vessel construction.

BRIEF SUMMARY OF THE INVENTION

The present invention provides a safer and cost effective feeder transport vessel protocol where relative movement between a jack-up, fixed on the seabed, and the feeder transport barge is completely eliminated. This present invention also provides the offshore energy installation industry with safer systems and methods that have relatively lower cost, while at the same time, increasing the operational window. Operational up-time is increased when compared to a moored feeder transport vessel option, while costs are decreased when compared to using a second self-elevating vessel as a feeder transport vessel. Advantageously, the present invention contemplates using existing ocean and/or sea barges or boats to supply, re-supply and remove cargo and/or components, further reducing costs. The proposed wind turbine installation offshore jack-up to be used, using the U.S. Jones Act compliant feeder transport vessel protocol, if built in Asia, is estimated to cost approximately $300 million U.S.D.—half the cost of the above discussed Dominion Energy's Charybdis jack-up. Also, if, or when, existing U.S. barges are not used, a feeder transport barge, built in the U.S., has an estimated construction cost of approximately $10 million U.S.D.

One engineered embodiment to make this installation of turbine components safer and more efficient, uses an open truss rack structure system fitted to the transom of a self-elevating vessel to lift feeder transport barges out of the sea, thereby eliminating relative motion between the installation jack-up and the barge while lifting and installing wind turbine components in the sea. Therefore, operators do not have to lift the wind turbine components off of a moving feeder barge.

In one embodiment, a rack and pinion jacking system between the rack structure and jack-up is used to vertically lower and raise the rack structure to/from the sea. A feeder barge with cargo and/or components can then be floated over the submerged rack structure and secured. Then, the self-elevating installation jack-up uses its onboard leg jacking system to elevate, while also lifting the rack structure. Therefore, the feeder barge and its cargo and/or components are entirely out of the sea. From this position, the jack-up main lifting device or crane installs the cargo and/or wind turbine components directly from the barge to the wind turbine foundation formed in/on the seabed. After the turbine installation is complete, the self-elevating vessel jacks down to submerge the rack structure to refloat the emptied feeder barge. The rack structure can then be moved to its stowed position.

In addition to eliminating relative barge motion or movement, another advantage of the rack structure system and method is that the movable rack structure embodiments can receive the barge even after the jack-up hull is elevated above the sea surface, reducing wear and tear on the jack-up leg/hull interface. Once the legs of a jack-up are engaged with the seabed, it is standard practice to preload and get the jack-up hull out of the water as soon as possible. In other words, once the legs of a jack-up touch the seabed, even the minimal environment on the hull of a jack-up, such as waves and current, place wear and tear on the legs, guides, jacking system, etc. because the load from the hull travels through the leg/hull interface down to the seabed. With the rack structure system and method, the operator can quickly go through the preloading of the leg footings to obtain a minimal air gap before bringing the feeder transport vessel onto the rack structure. Then, the rack structure can be deployed and the feeder transport vessel can be floated on the rack structure and elevated.

The rack structure system and method has been further engineered to be installed on newbuilds or retrofitted and is designed to lift a barge of sufficient size and capability to transport 20 megawatt (MW) wind turbine components but other size and capabilities are contemplated. The rack structure system and method of the present invention, which can be used for relatively small jack-ups in the U.S. that would not transport wind turbines due to Jones Act restrictions, can also be used on larger WTIVs that could operate internationally as well, since the rack structure is designed to be removeable.

BRIEF DESCRIPTION OF THE VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings herein illustrate only typical embodiments of this invention and are therefore not to be considered limiting of its scope, for the invention may be used in other equally effective embodiments.

FIG. 5 is a side elevational view of the pivoting rack structure, as adjacent to a bottom supported tower section extending from the seabed best illustrated in FIG. 3, but in the stowed position relative to the self-elevating vessel floating and further illustrating a feeder transport vessel, such as a barge, with the wind turbine components thereon, floating adjacent to the self-elevating vessel.

FIG. 7A is a side elevational view of the floating feeder transport vessel, such as a barge, and its cargo and/or wind turbine components positioned above the pivoting rack structure but not yet supported by the rack structure.

FIGS. 22A and 22B is a section perspective view of a barge having pivoting dynamic positioning systems in the stowed position (22A) and the deployed propelling position (22B).

DETAILED DESCRIPTION OF THE INVENTION

Figure 1:
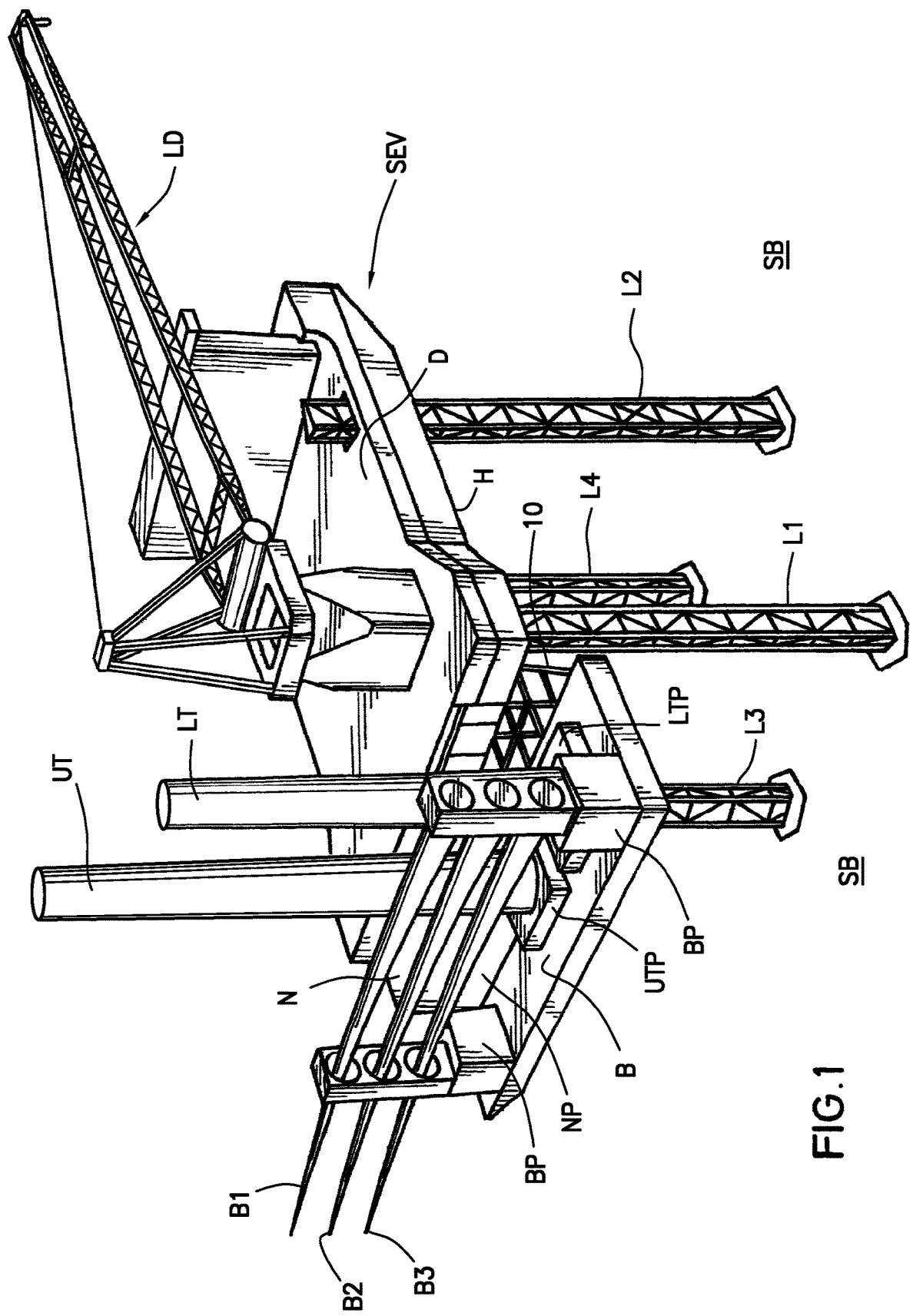
FIG. 1 is a perspective view of one embodiment of a self-elevating vessel rack structure in the deployed position with a feeder transport vessel thereon so that the wind turbine components are raised above the sea surface by elevating the self-elevating vessel.
Figure 3:
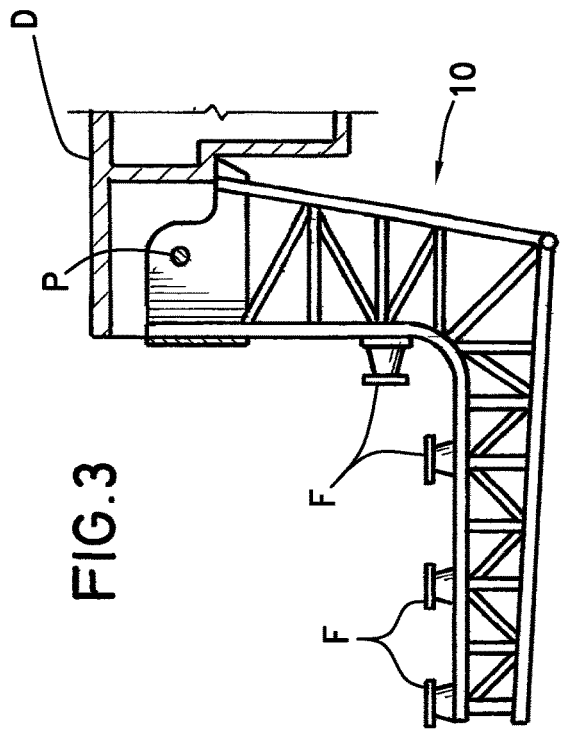
FIG. 3 is a side elevational section view of the pivoting rack structure, as illustrated in FIG. 2, in the deployed position.

As best shown in the FIGS., typical wind turbine components comprise a nacelle N, a lower column/tower LT, an upper column/tower UT and a plurality of blades B1, B2, B3. It is contemplated that the nacelle N, lower tower LT, upper tower UT and the blades B1, B2, B3 are each secured to their separate platforms NP, LTP, UTP and BP, respectively, as best shown in FIG. 1. It is to be understood that the present invention could also be used for assembly and installation of a bottom supported column or tower section BSTS in a seabed SB, as discussed below and as shown in the FIGS. Therefore, the term "wind turbine components," "wind components," and "energy components" include a bottom supported column or tower section BSTS and its assembly and installation. For example, as will be disclosed in detail below, the lifting device LD, as best shown in FIGS. 8 and 20, could first move the bottom supported column or tower section BSTS from the barge B and install it in the seabed SB, as shown in FIGS. 5 to 8A, 19 and 20, and then move the lower tower LT and upper UT, as discussed below, for assembly and installation. As will be disclosed below, it is also contemplated that the present invention could be used to install a seabed supported turbine foundation from the feeder transport vessel B using the lifting device LD along with other known traditional equipment and installation procedures and methods.

Pivoting Rack Structure Embodiment

Figure 6:
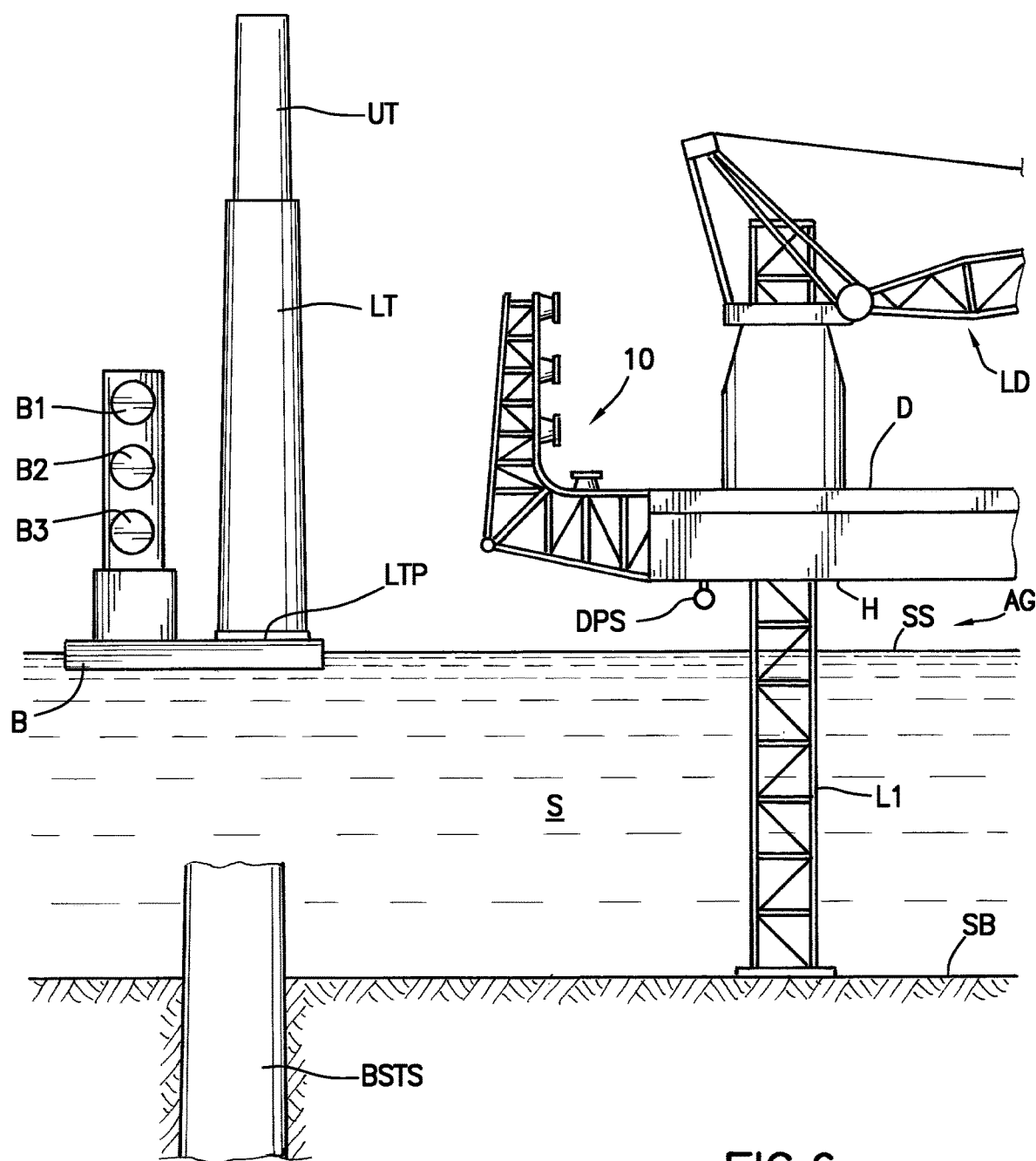
FIG. 6 is a side elevational view of the self-elevating vessel, as illustrating in FIG. 5, but illustrating one of its 4 legs in contact with the seabed to illustrate the preferred next step after FIG. 5 with the pivoting rack structure still in the stowed position but the self-elevating vessel hull elevated above the sea surface to provide an air gap.
Figure 7B:
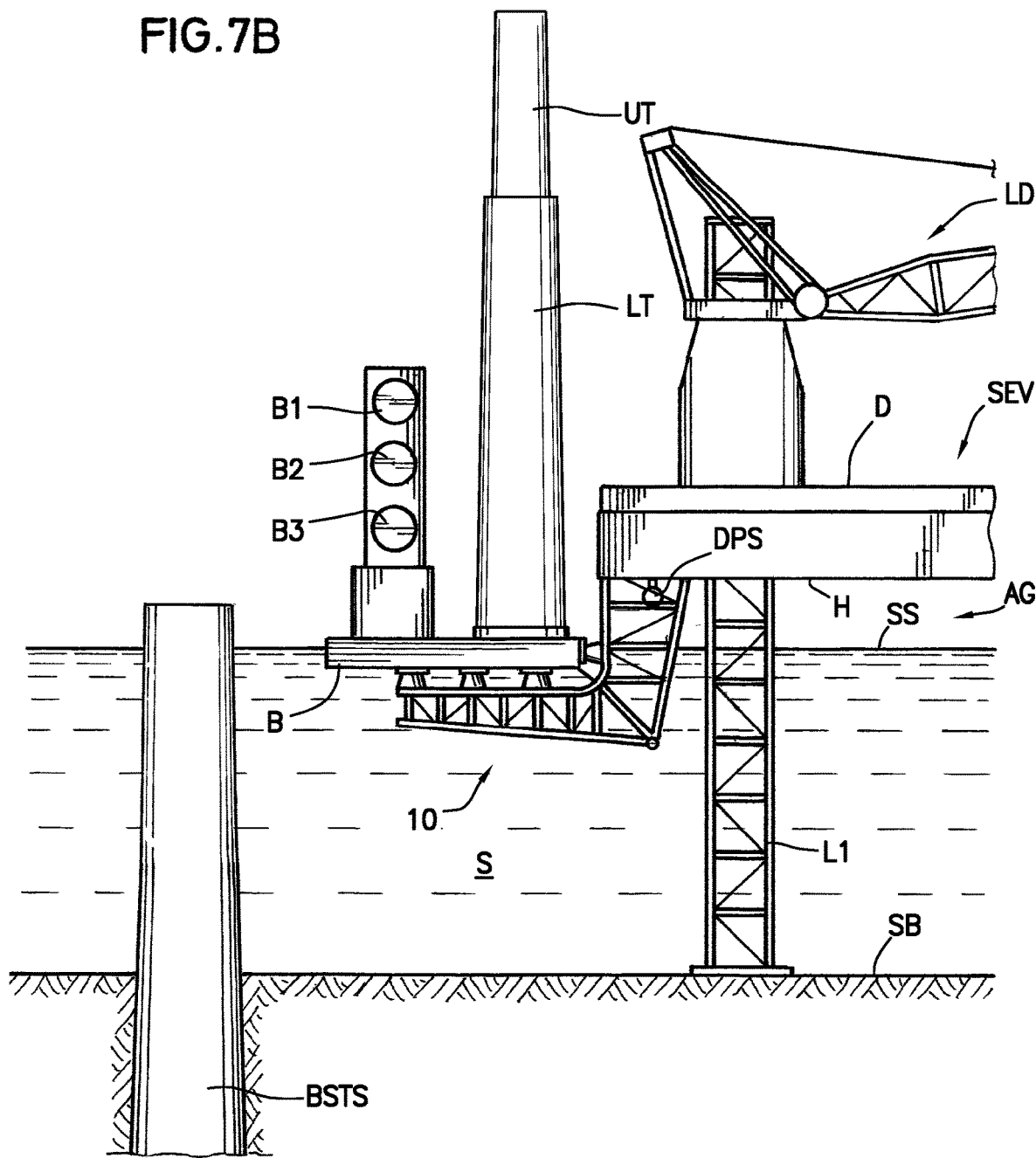
FIG. 7B is a side elevational view of the feeder transport vessel, such as a barge, and its cargo and/or wind turbine components supported on the pivoting rack structure and the self-elevating vessel elevated higher to provide a greater air gap than illustrated in FIG. 7A to reduce the feeder transport vessel's draft.
Figure 8:
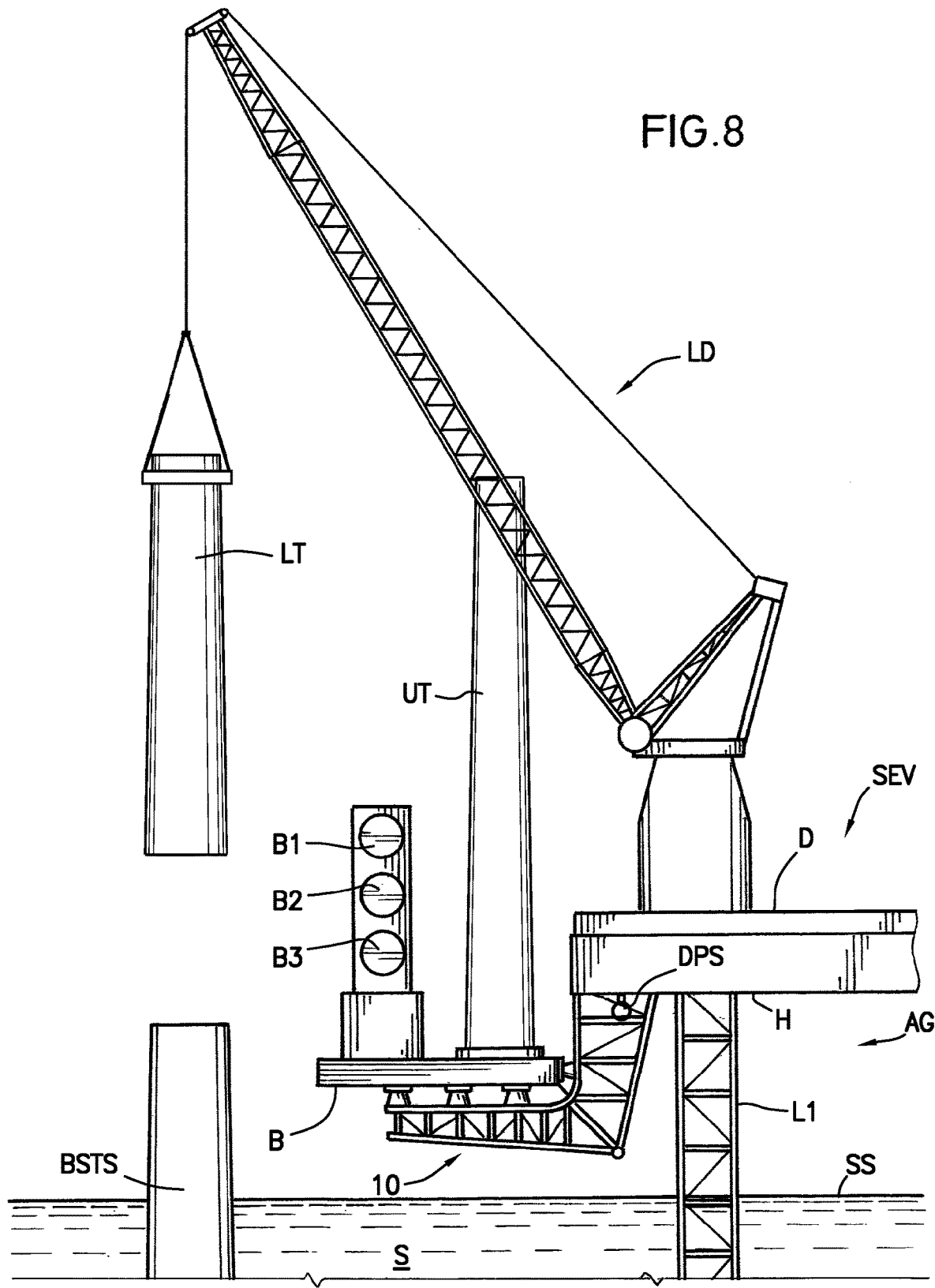
FIG. 8 is a side elevational view of the feeder transport vessel, such as a barge, and its cargo and/or wind turbine components supported by the pivoting rack structure in the deployed position and the self-elevating vessel elevated higher than as illustrated in FIG. 7B so that the feeder transport vessel, such as a barge, is above the sea surface, FIG. 8 further illustrates a self-elevating vessel lifting device, such as a crane, installing the wind turbine components from the feeder transport vessel after relative movement between the vessels is eliminated.
Figure 8A:
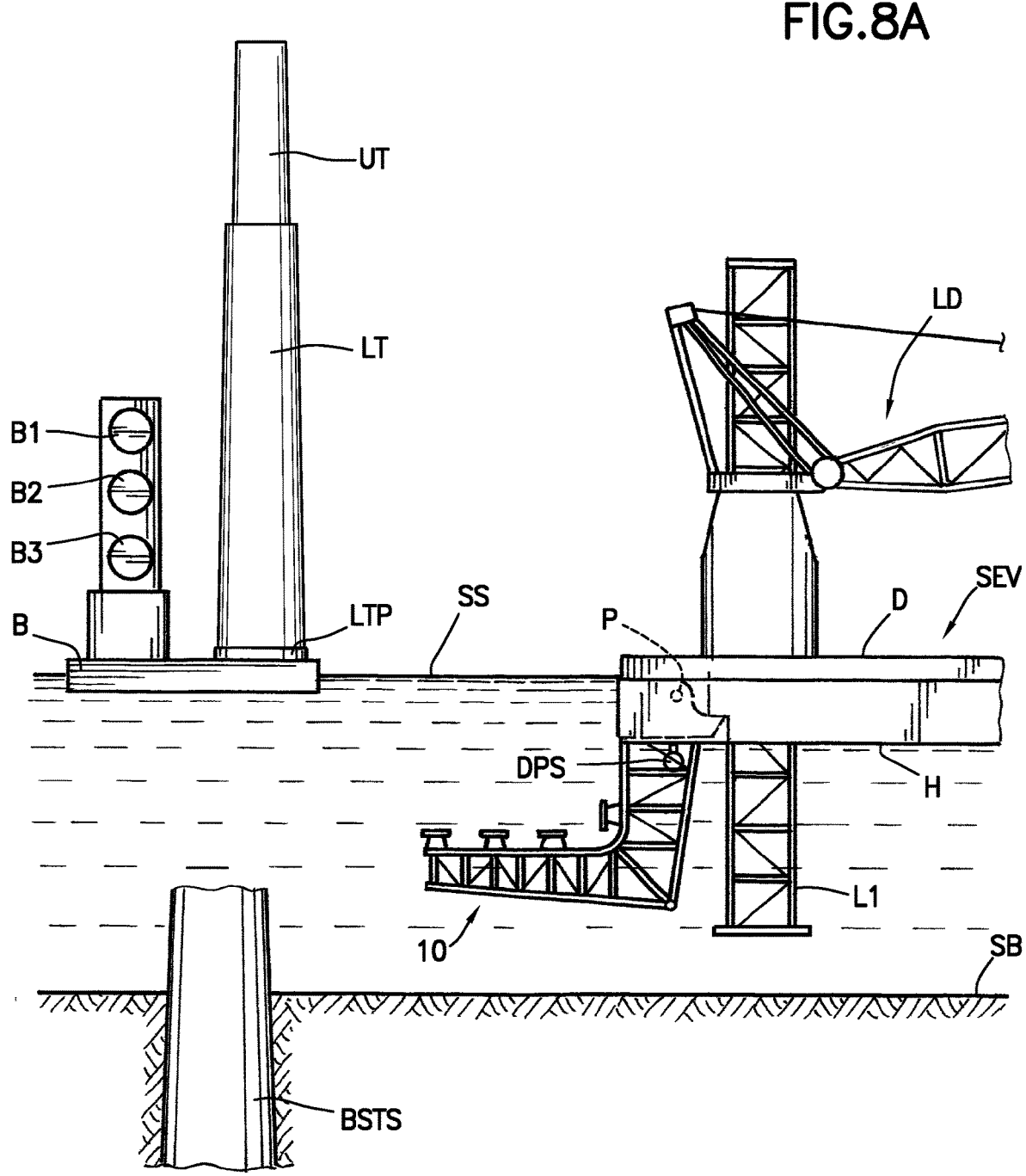
FIG. 8A is a side elevational view of the self-elevating vessel floating, as illustrated in FIG. 5, but with the open truss rack structure illustrated in the deployed position so as to be submerged below the sea surface for in-field transit operations of the self-elevating vessel.
Figure 9:
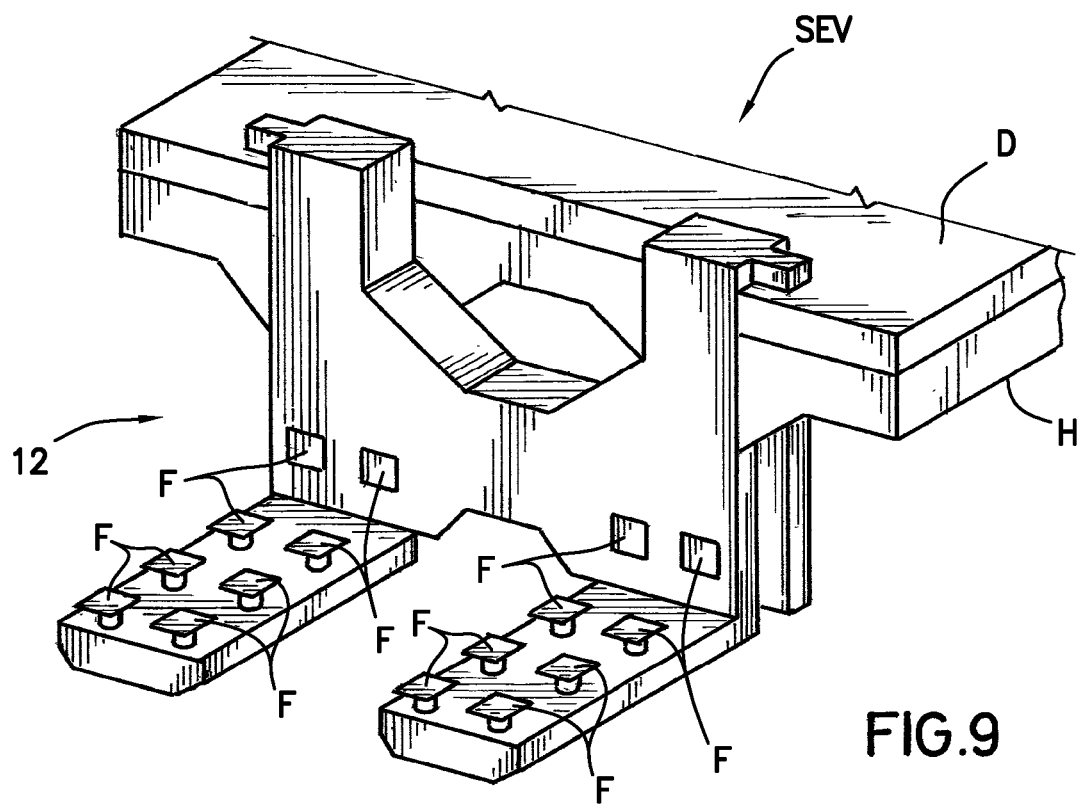
FIG. 9 is a perspective view of another embodiment of a monolithic rack structure in the deployed position better illustrating the vertically slidable interengagement with a self-elevating vessel.
Figure 10:
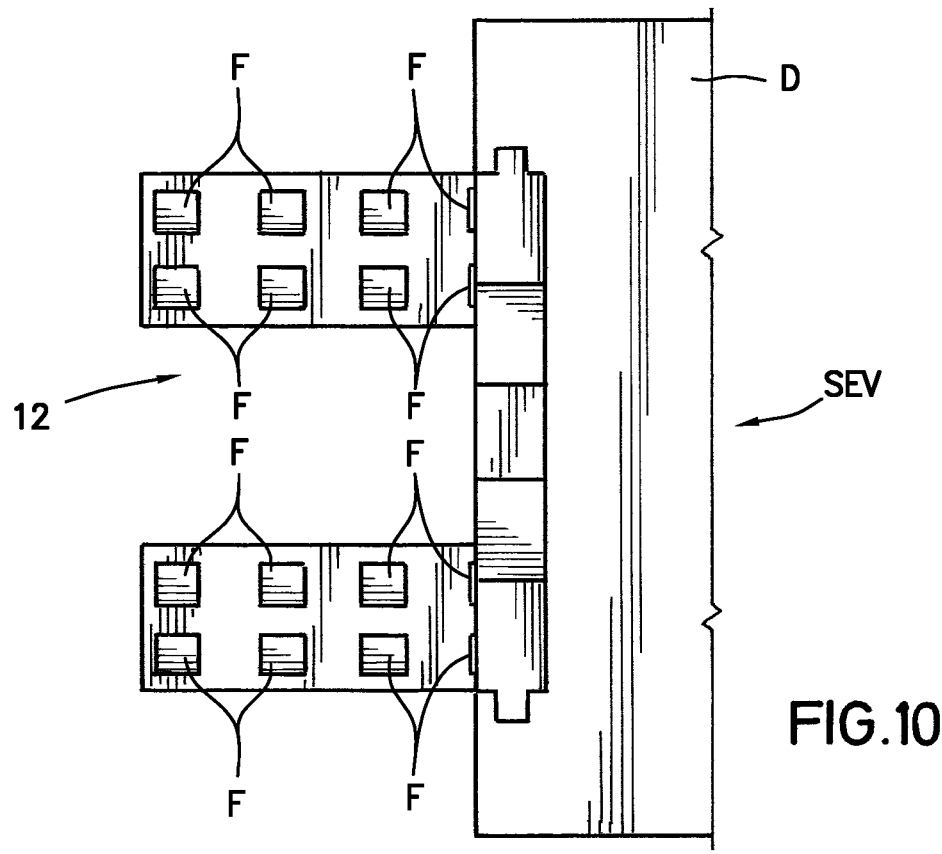
FIG. 10 is a plan view of the embodiment of the monolithic rack structure, as illustrated in FIG. 9, in the deployed position better illustrating the vertically slidable interengagement with the self-elevating vessel.
Figure 11:
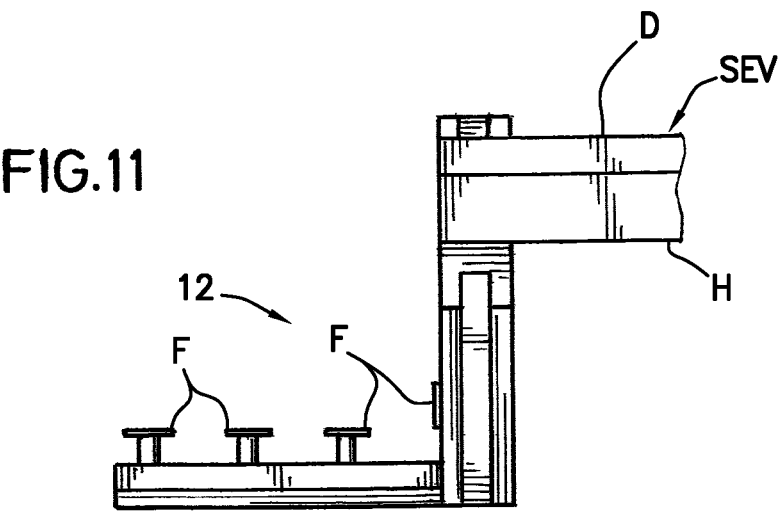
FIG. 11 is a side elevational view of the embodiment of the monolithic rack structure, as shown in FIGS. 9 and 10, in the deployed position better illustrating the vertically slidable interengagement with the self-elevating vessel.

One embodiment of a system and method for a rack structure system for a feeder transport vessel adapted for use with an offshore self-elevating vessel SEV is shown in FIGS. 1 to 8A. This embodiment delivers a safer, efficient and reliable method of supplying, resupplying and/or removing cargo and/or components to/from a predetermined offshore location. L-shaped open truss rack structure 10 system are pivotably hinged to a transom of a relatively small, purpose-built self-elevating vessel or jack-up SEV. These 2 rack structures 10 serve as a shelf, dock, or rack for a feeder transport vessel, such as an ocean or sea barge or boat B. The 2 L-shaped open truss rack structures 10 are movable between a stored or stowed vertical position (FIGS. 5 and 6) and a deployed horizontal position (FIGS. 1 to 4, 7A, 7B, 8 and 8A) via internal hinged pivot connection P interengagement with the self-elevating vessel SEV. As discussed above, it is standard practice, as best shown in FIG. 6, when the jack-up SEV arrives at its predetermined location that the jack-up legs L1, L2, L3 and L4 are engaged with the seabed SB to preload the jack-up SEV to position the jack-up hull H above the sea surface SS to create an air gap AG. The rack structure 10 system is then deployed, as best shown in FIG. 7A. The feeder transport vessel, such as barge B, with its cargo and/or wind turbine components is then floated over the rack structure system, as best shown in FIG. 7A, and secured (as best shown in FIGS. 13 to 17) to the transom of the self-elevating vessel SEV. Once secured, the self-elevating vessel SEV will use its jacking system including the legs L1, L2, L3 and L4 to raise the barge B above the sea surface SS, as best shown in FIGS. 7B and 8, to a suitable air gap AG for operations. From this position, a lifting device LD, such as a pedestal mounted crane or gantry crane, can be used to install the wind turbine components directly from the barge B onto a pre-installed bottom supported column or tower section BSTS extending from a seabed SB supported foundation (FIGS. 6 to 8A). Preferably, the bottom supported column or tower section BSTS extending from the seabed SB foundation will be on the starboard side of the self-elevating vessel SEV, such as in FIG. 5, but other orientations, such as FIGS. 6 to 8A, are contemplated. It is also contemplated that different types of lifting devices LD could be used and that the lifting device LD, such as a crane, could, if desired, movably skid to different locations on the deck D of the self-elevating vessel SEV. Once the wind turbine components are assembled and installed, the self-elevating vessel SEV can be jacked down so the barge B is floating on the sea surface SS, and the barge B is removed and, if desired, replaced by another barge B. The open truss rack structures 10, 14 system (FIGS. 2 to 8A and FIGS. 13 to 16) will allow the self-elevating vessel SEV to better transit for in-field operations in the sea S with the rack structure 10, 14 system deployed (for example, see FIG. 8A). If the self-elevating vessel SEV comes to port or mainland dockside, the rack structure 10, 14 system can be moved to the stowed position (FIGS. 5 and 6) to decrease the overall transit depth of the self-elevating vessel SEV. This system provides a safer, streamlined method for use of an offshore feeder transport vessel B with a jack-up SEV. It is also contemplated when there are 2 rack structures, such as in rack structure systems 10 and 14, the rack structures could move independently or be synchronized to move simultaneously.

System Components:
(1) Rack structure 10—2 tubular, L-shaped open truss structures of the rack structure system 10 supported by hinges P for pivoting relative to the self-elevating vessel SEV using plated bearing surfaces is contemplated. It is further contemplated that any number of open truss structures 10 from 1 to multiples could be used for the rack structure system 10. The tubular open truss rack structure 10 system, besides decreasing drag while the self-elevating vessel SEV is in transit, provides the desired structural stability for its relative weight. It is also contemplated that the rack structure 10 system will be sized and fitted with fenders F, such as fabricated with conventional reinforced elastomer, capable of withstanding impact loads from a feeder transport vessel, such as a barge B, and its cargo and/or wind turbine components. It is contemplated that the horizontal facing and vertically facing fenders F on the rack structure 10 system could be provided by Trelleborg Group of Sweden or its U.S. affiliate, Trelleborg Sealing Solutions of Houston, Texas.

(2) Deployment—The rack structure 10 may be moved between the deployed positions and stowed positions by a number of means. For example, use of the self-elevating vessel's lifting device LID, such as a crane, or use of a rotating mechanism including motors M (M1, M2) and gears are contemplated. While the rack structure 10 system is illustrated on the self-elevating vessel SEV transom, it is to be understood that the rack structure is also contemplated to be interengaged on the self-elevating vessel SEV port, starboard and/or bow and that multiple separate rack structures could be interengaged with the jack-up SEV on different sides of the jack-up SEV.

(3) Barge Securing—It is contemplated that feeder transport vessel, such as a barge B, will be secured to the self-elevating vessel's transom using multiple winch W and mooring line C systems or other conventional or proprietary alternate means. For example, it is contemplated that the feeder transport vessel B can be secured to the self-elevating vessel SEV using a barge restraint system, such as provided by Smith Berger Marine, Inc. of Seattle, Washington, independently or in combination with line handling cranes LC, as shown in FIGS. 13 to 17, such as provided by Palfinger Marine GmbH of Salzburg, Austria or its U.S. affiliate, Palfinger Marine USA Inc. of New Iberia, Louisiana. It is also comtemplated that line handling winches W (see FIGS. 13 to 17), such as provided by Smith Berger Marine, Inc. of Seattle, Washington, could be used.

Method of Operation:
1. The self-elevating vessel SEV arrives on a predetermined location and is positioned using its conventional dynamic positioning system "DPS" on the hull H of the vessel SEV so that, for example, the starboard side of the self-elevating vessel SEV is adjacent to a wind turbine installation location with a pre-installed bottom supported column/tower section BSTS extending above the sea surface SS from a seabed SB supported foundation. See FIG. 5 (starboard side) and see also FIGS. 6 to 8A for an alternate stern location(s).

2. The 4 self-elevating vessel legs L1, L2, L3 and L4 are then pre-loaded to elevate the self-elevating vessel SEV using conventional self-elevating vessel jacking means and methods to provide an operational air gap AG between the self-elevating hull H and the sea surface SS, as best shown in FIG. 6, for reducing wear and tear on the jack-up SEV as discussed above in detail.

Figure 4:
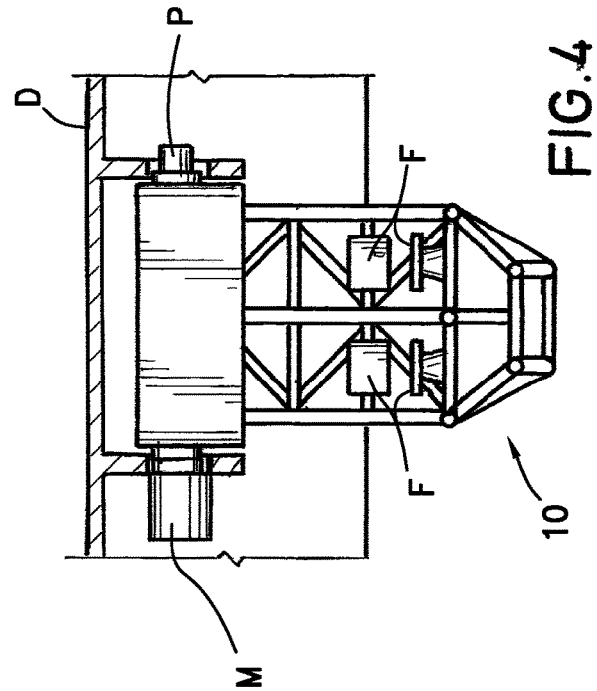
FIG. 4 is an aft or rear (stern) side elevational view of the pivoting rack structure, as illustrated in FIGS. 2 and 3.
Figure 2:
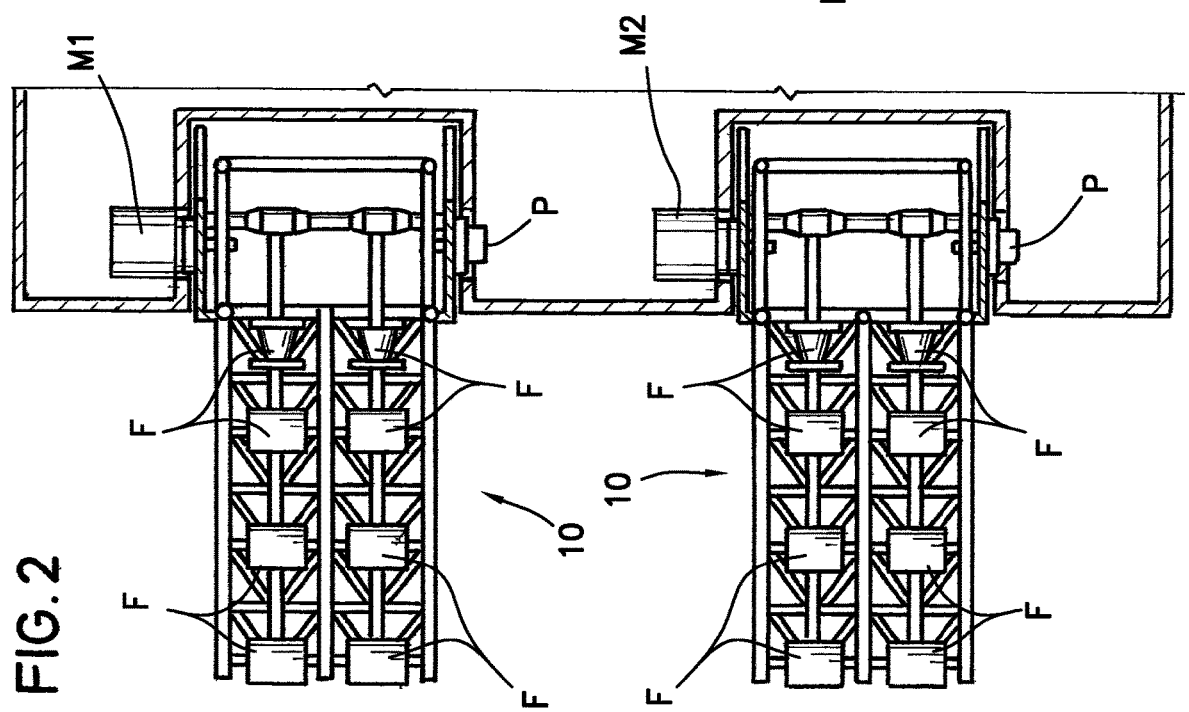
FIG. 2 is a plan view of the pivoting rack structure of FIG. 1 hinged with the self-elevating vessel and pivoted to the deployed position.

3. The rack structure 10 system is then pivoted from the stowed position to the deployed position to deploy the rack structure 10 system, as best shown in FIG. 7A 4. The feeder transport vessel, such as an ocean barge or boat B, and its cargo and or wind turbine components are floated over the rack structure system, as best shown in FIG. 7A. While the barge B can be towed by a vessel, such as a tug boat (not shown) using tow lines TL (see, for example, FIGS. 22A and 22B), it is also contemplated the barge B could use a DPS to position the barge B over the rack structure 10. It is further contemplated that the barge B could be retrofitted or newbuild constructed with a pivoting PDPS movable between a raised stowed position (FIG. 22A) above the sea surface SS and a deployed position (FIG. 22B) submerged in the sea S to a desired predetermined position to propel the barge B in the sea.

5. The feeder transport vessel, such as barge B, is then secured (see FIGS. 13 to 17) to the transom of a self-elevating vessel SEV, as best shown in FIGS. 7A and 7B. Some contemplated means and methods to secure the barge with the self-elevating vessel SEV were previously described above in detail along with some known manufacturers. With the self-elevating vessel hull H elevated and supported on the seabed SB raised above the sea surface SS relative motion or movement between the vessel SEV and the barge B is eliminated.

6. The self-elevating vessel SEV is then further elevated so that the feeder transport vessel B and its cargo and/or wind turbine components are at a greater operational air gap AG, as best shown in FIG. 8, so that the barge B and its cargo and components are above the sea surface SS.

7. The lifting device LD, such as a boom crane, can then begin assembling and installing the wind turbine components from the feeder transport vessel B with the bottom supported column/tower section BSTS extending above the sea surface SS from the seabed SB, as best shown in FIG. 8. If the starboard side of the self-elevating vessel SEV is adjacent to the bottom column/tower BSTS extending from the sea surface SS, it is preferred to first lift and position the lower column/tower LT from the barge B. The upper column/tower UT, located between the lower column/tower LT and the nacelle N, is then lifted and assembled, as best shown in FIGS. 1 and 8.

In summary, a safer method for use of a self-elevating vessel SEV supported on a seabed SB for elevating above a sea surface SS is disclosed for offshore installation of cargo and/or wind turbine components, or other energy components. Once at the desired location, the self-elevating vessel hull H is elevated above the sea surface SS to create an air gap AG, the rack structure 10 the horizontal portion supporting a barge B of system is moved relative to the self-elevating vessel SEV from a stowed position to a deployed position. When the 2 L-shaped open truss rack structures 10 are in the stowed position, the rack structure 10 the horizontal portion supporting a barge B of system is configured to provide a greater clearance with the seabed SB than when the rack structure 10 the horizontal portion supporting a barge B of system is in said deployed position. Upon raising the horizontal portion supporting a barge B of system the rack structure 10 the horizontal portion supporting a barge B of system above the sea surface SS by further elevating the self-elevating vessel SEV relative motion or movement between the self-elevating vessel SEV and the rack structure 10 the horizontal portion supporting a barge B of system is advantageously eliminated. This elimination of relative motion provides a safer environment for moving the cargo and/or wind turbine components supported by the rack structure 10 the horizontal portion supporting a barge B of system in its deployed position with a lifting device LD, such as a crane, for installation at sea S.

While the present invention has been illustrated with a single feeder transport vessel B for installation of cargo and/or wind turbine components, it is contemplated that a plurality of feeder transport vessels B could be used to provide a continuous supply of cargo and/or components to the one predetermined location or to different predetermined locations.

Also, while the present invention has been illustrated for installation of cargo and/or components, it is contemplated that the disclosed systems could be used in reversing the method or steps for decommissioning, deinstallation, removal, repair of wind turbine systems from the sea S.

Monolithic Vertically Slidable Rack Structure Embodiment

Figure 12:
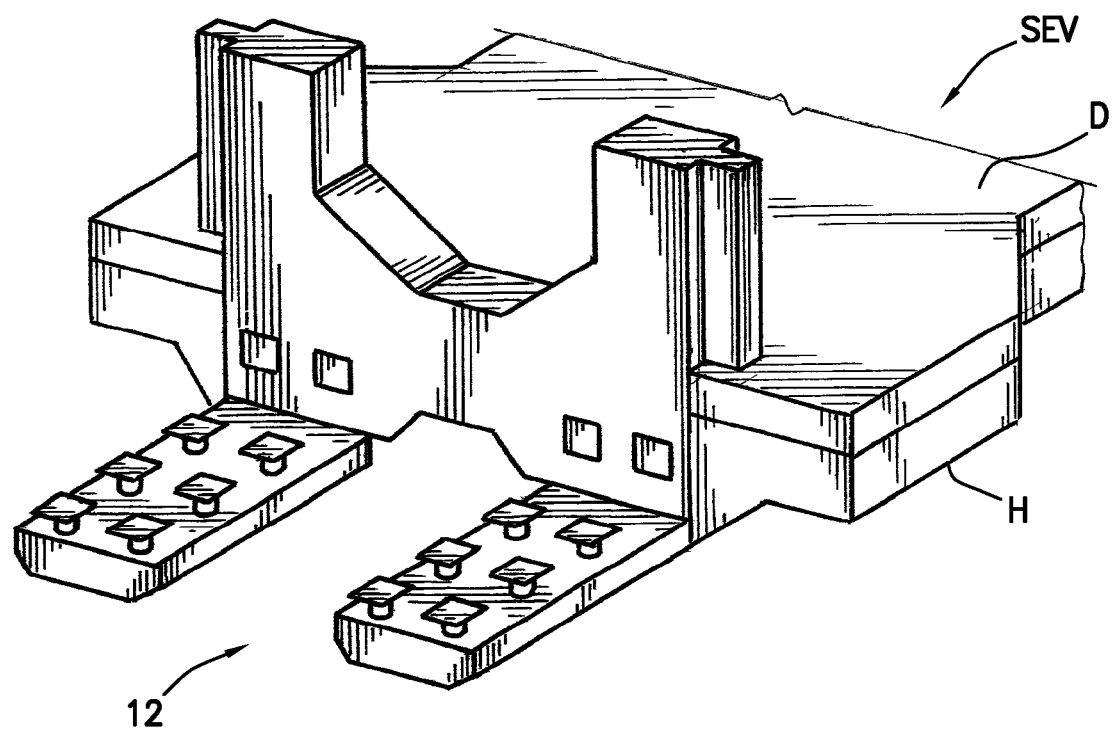
FIG. 12 is a perspective view of the monolithic rack structure, similar to FIGS. 9, 10 and 11, but in the stowed position, similar to the FIGS. 5 and 6 stowed positions, but vertically slidably interengaged with the self-elevating vessel so that a feeder transport vessel is positioned thereon and the rack structure is raised above the sea surface by elevating the self-elevating vessel or, alternatively, the rack structure could vertically slidably raise the feeder transport vessel, such as a barge, independent of the self-elevating vessel.
Figure 13:
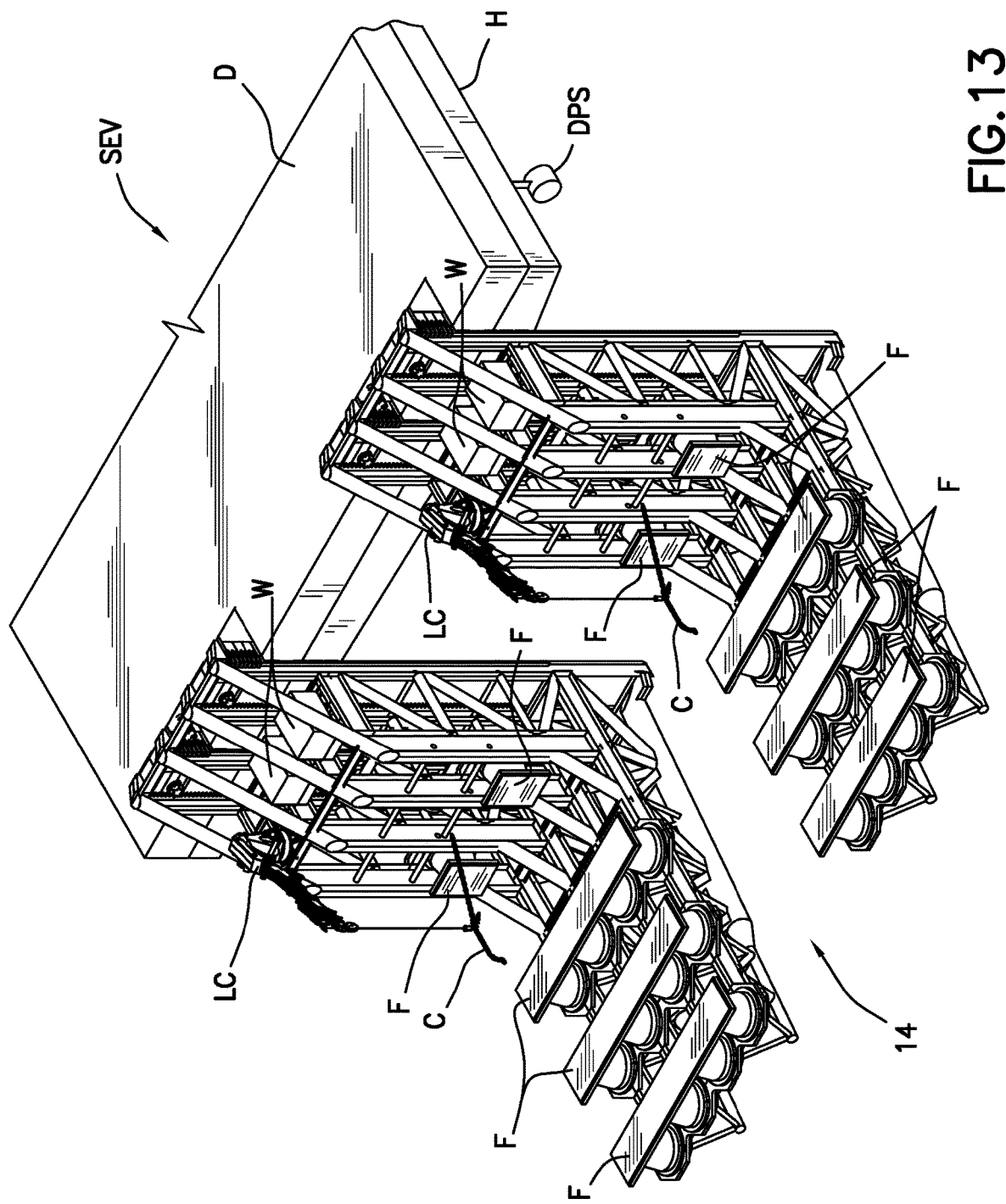
FIG. 13 is a perspective view of another embodiment of open truss rack structure in the deployed position better illustrating the vertically slidable interengagement with a self-elevating vessel.
Figure 14:
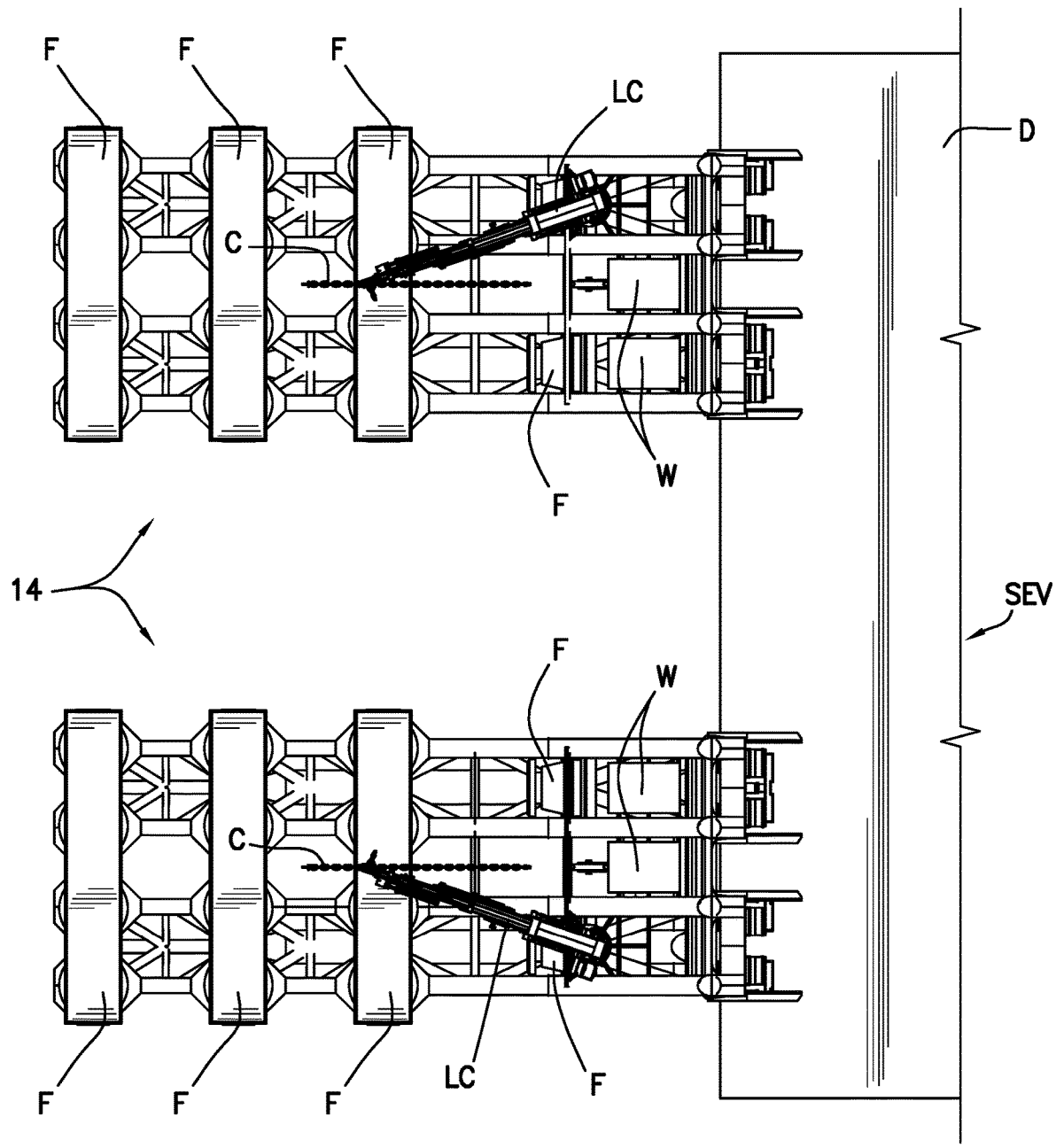
FIG. 14 is a plan view of the embodiment of the open truss rack structure, as illustrated in FIG. 13, in the deployed position better illustrating the vertically slidable interengagement with the self-elevating vessel.
Figure 15:
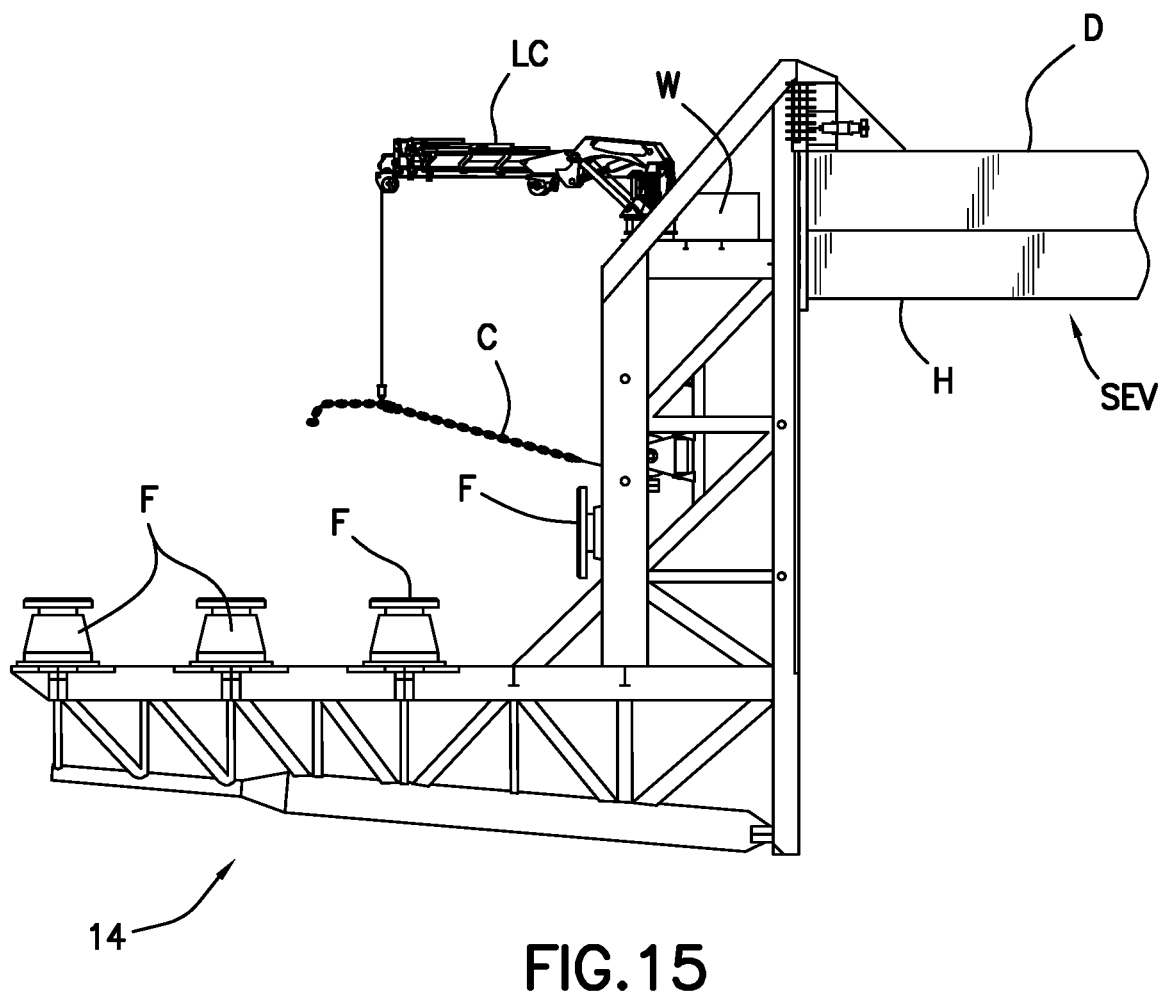
FIG. 15 is a side elevational view of the embodiment of the open truss rack structure, as shown in FIGS. 13 and 14, in the deployed position better illustrating the vertically slidable interengagement with the self-elevating vessel.

Another embodiment of a system and method for a rack structure system for a feeder transport vessel adapted for use with an offshore self-elevating vessel SEV is shown in FIGS. 9 to 12. This monolithic vertically slidable rack structure 12 embodiment also delivers a safer, efficient and reliable method of supplying, resupplying and/or removing energy components, such as wind turbine components, to a predetermined offshore location. Generally, a monolithic L-shaped plated rack structure 12 is fitted and slidably interengaged to the transom of a relatively small, purpose-built self-elevating vessel SEV. While one monolithic rack structure 12 is illustrated in FIGS. 9 to 12, it is contemplated that multiple monolithic vertically slidable rack structures could be used. As will be discussed in detail below, FIGS. 13 to 17 illustrate an open truss vertically slidable rack structure 14. This monolithic rack structure 12 also serves as a shelf, dock, or rack for a feeder transport vessel, such as an ocean or sea barge or boat B. The L-shaped monolithic rack structure 12 can be stowed aft of the self-elevating vessel SEV in its elevated stowed position (FIG. 12) and lowered in its deployed position (FIGS. 9, 10 and 11) to extend below the sea surface SS, similar to the pivoting open truss rack structure 10 system, as best shown in FIGS. 7A and 7B. Again, while the monolithic rack structure 12 is illustrated on the self-elevating vessel SEV transom, it is contemplated that the rack structure 12 could be on the self-elevating vessel SEV port, starboard and/or bow and that multiple number and types (10, 12, 14, 16) of separate rack structure systems could be interengaged with the jack-up SEV. As described above after the self-elevating vessel hull H has been elevated to create an air gap AG, the barge B, with its cargo and/or wind turbine components, will be floated over the monolithic rack structure 12 while deployed (similar to the barge B in FIG. 7A) and secured to the transom. Once secured, the self-elevating vessel SEV will use its jacking system including legs L1, L2, L3 and L4 to raise the barge B above the sea surface SS suitable for operations (similar to the self-elevating vessel SEV of FIGS. 7B and 8). From this raised position of the barge B, a lifting device LD, such as the illustrated pedestal mounted crane, can be used to move the cargo and/or components from the barge B, for example, to assemble and install the energy components, such as wind turbine components, directly from the barge B onto a pre-installed bottom supported column/tower section BSTS extending from the seabed SB supported foundation (similar to the lifting device LD of FIG. 8). Once the components are assembled and installed, the self-elevating vessel SEV will jack down so the feeder transport vessel B is floating and removed under its own DPS or by a tow/tug boat. The monolithic rack structure 12 is then slidably raised to the stowed position (FIG. 12). This system provides a safer, streamlined method for an offshore feeder transport vessel B with a jack-up SEV.

System Components:
  (1) Rack structure—Plated, L-shaped monolithic rack structure 12, supported guide systems and plated bearing surfaces. It is contemplated that the monolithic rack structure 12 will be fitted with fenders F, such as fabricated with reinforced elastomer, capable of withstanding impact loads from a feeder transport vessel and its cargo and/or wind turbine components, as described in detail above.
  (2) Deployment—The vertically slidable monolithic rack structure 12 may be deployed and stowed by a number of means. For example, use of the vessel's crane LD or use of a rack and pinion system (see, for example, FIGS. 16 and 17), flooding and de-ballasting are contemplated. While the monolithic rack structure 12 is illustrated on the self-elevating vessel SEV transom, the monolithic rack structure 12 is also contemplated to be interengaged on the self-elevating vessel SEV port, starboard or bow.
  (3) Barge Securing—It is further contemplated that the feeder transport vessel B will be secured to the self-elevating vessel SEV's transom (or any other desired side) using multiple winch W and line systems C or other conventional alternate means LC as described in detail above.

Method of Use:
  In summary, a method for use with a self-elevating vessel SEV supported on a seabed SB configured for elevating above a sea surface SS is disclosed for offshore installation of cargo and/or components, such as energy components. Once at the desired location, the self-elevating vessel SEV is elevated to create an air gap AG, the monolithic rack structure 12 slidably moves vertically relative to the self-elevating vessel SEV from a stowed position to a deployed position. When the rack structure 12 is in the stowed position, the rack structure 12 provides a greater clearance with the seabed than when the rack structure 12 is in the deployed position. Upon raising the monolithic rack structure 12 horizontal portion supporting a barge B above the sea surface with the self-elevating vessel SEV jacking system including its legs L1, L2, L3 and L4, relative motion or movement between the self-elevating vessel SEV and the rack structure 12 is eliminated. This elimination of relative motion provides for safer moving of the cargo and/or components supported by the monolithic rack structure 12 in its deployed position with a lifting device LD on the self-elevating vessel SEV for assembling and installation of the components at sea S.

Open Truss Vertically Slidable Rack Structure Embodiment

Another embodiment of a system and method for a rack structure system for a feeder transport vessel adapted for use with an offshore self-elevating vessel SEV is shown in FIGS. 13 to 17. This open truss vertically slidable rack structure 14 embodiment also delivers a safer, efficient and reliable method of supplying, resupplying and/or removing energy components, such as wind turbine components, to a predetermined offshore location. Generally, an open truss L-shaped plated rack structure system 14 is fitted and slidably interengaged to the transom of a relatively small, purpose-built self-elevating vessel SEV. While 2 open truss rack structures 14 are illustrated in FIGS. 13 to 17, it is contemplated that a single vertically slidable rack structure could be used. FIGS. 13 to 17 illustrate an open truss vertically slidable rack structure 14 system that also serves as a shelf, dock, or rack for a feeder transport vessel, such as an ocean or sea barge or boat B. The L-shaped open truss rack structure 14 can be stowed aft of the self-elevating vessel SEV in its elevated stowed position (similar to FIG. 12) and its horizontal portion supporting a barge B lowered in its deployed position (FIGS. 13 to 17) beneath the sea surface SS, similar to the pivoting open truss rack structure 10 system, as best shown in FIGS. 7A and 7B. Again, while the open truss rack structure 14 system is illustrated on the self-elevating vessel SEV transom, it is contemplated that the rack structure 14 system could be on the self-elevating vessel SEV port, starboard and/or bow and that multiple number and types (10, 12, 14, 16) of separate rack structures could be interengaged with the jack-up SEV on different sides. As described above, after the self-elevating vessel hull H has been elevated to create an air gap AG, the barge B, with its cargo and/or wind turbine components, will be floated over the open truss rack structure 14 while deployed (similar to the barge B in FIG. 7A) and secured to the transom. Once secured, the self-elevating vessel SEV will use its jacking system including legs L1, L2, L3 and L4 to raise the barge B above the sea surface SS for operations (similar to the self-elevating vessel SEV of FIGS. 7B and 8). From this raised position of the barge B, a lifting device LD, such as the illustrated pedestal mounted crane, can be used to move the cargo and/or components from the barge B, for example, to assemble and install the energy components, such as wind turbine components, directly from the barge B onto a pre-installed bottom supported column/tower section BSTS extending above the sea surface SS from the seabed SB supported foundation (similar to the lifting device LD of FIG. 8). Once the components are assembled and installed, the self-elevating SEV vessel will jack down so the feeder transport vessel B is floating and removed under its own DPS or by a towing boat. The open truss rack structure 14 system is then slidably raised to the stowed position (similar to FIG. 12). This system provides a safer, streamlined method for an offshore feeder transport vessel B, as described in detail below, for use with a self-elevating vessel SEV.

Figure 16:
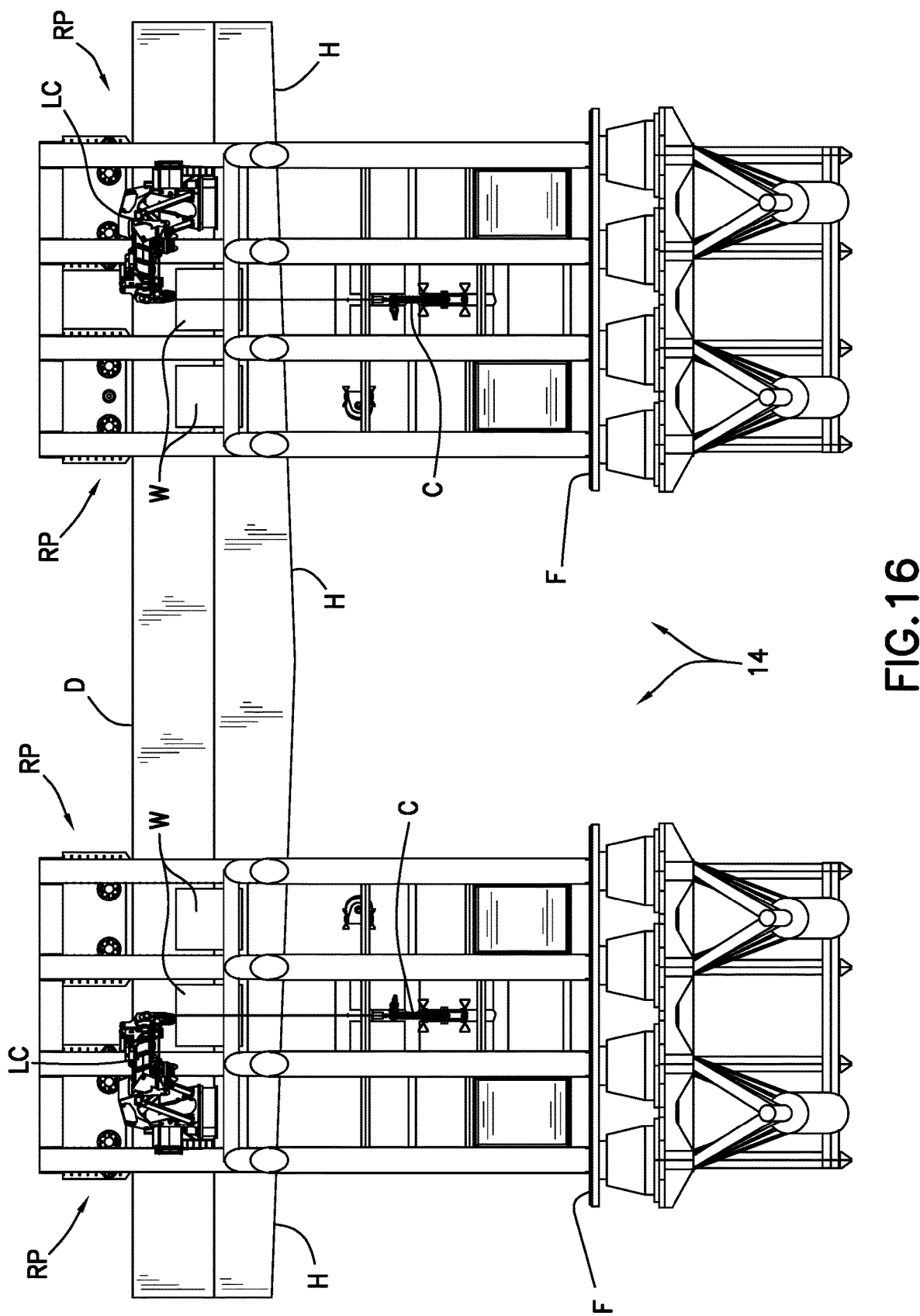
FIG. 16 is an aft or rear (stern) side elevational view of the vertically slidable rack structure, as illustrated in FIGS. 13, 14 and 15, in the deployed position.
Figure 17:
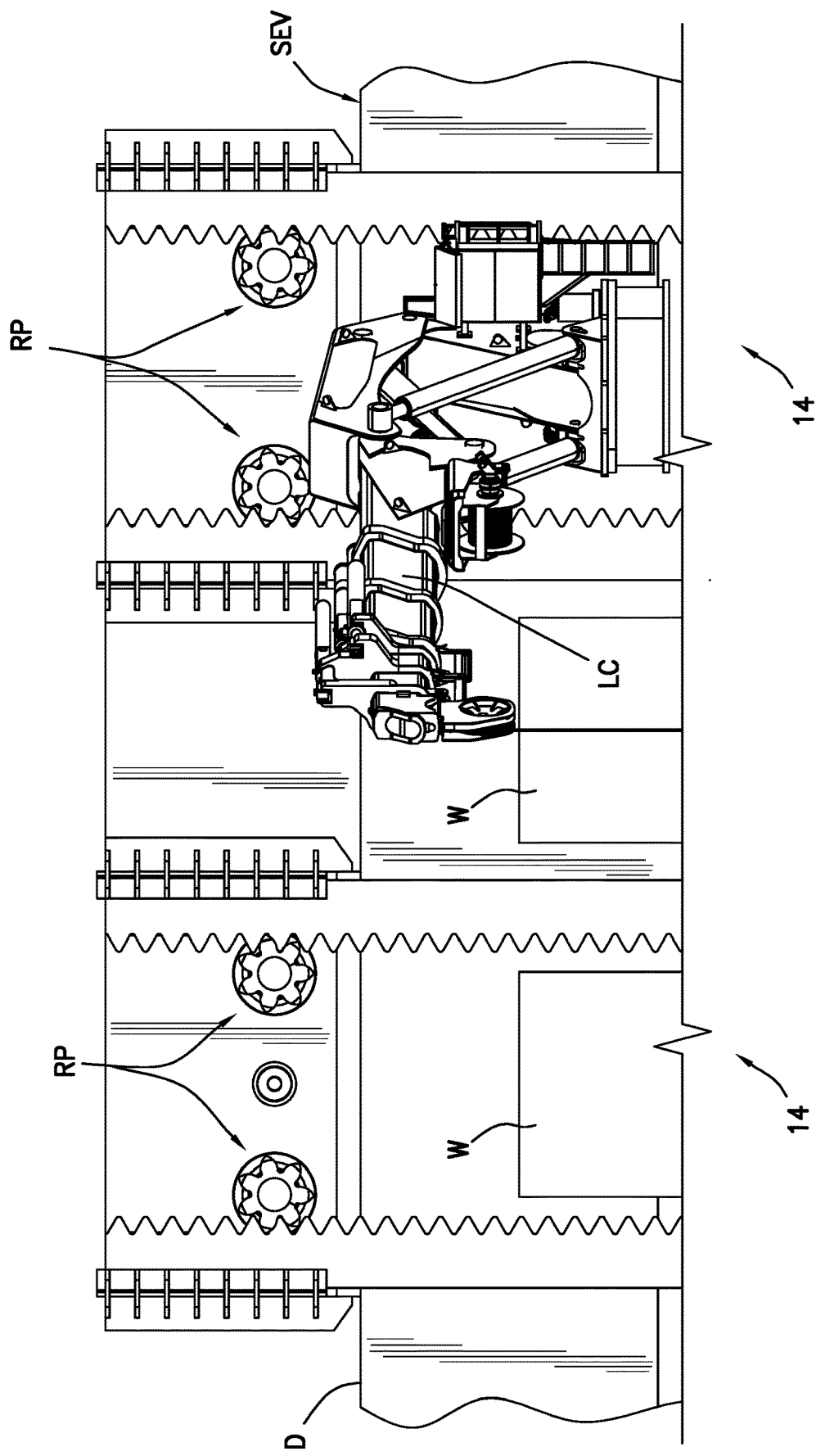
FIG. 17 is an aft or rear (stern) side elevational view of the vertically slidable rack structure, interengaged with the self-elevating vessel along with the rack and pinion means for moving the rack structure relative to the self-elevating vessel.
Figure 18:
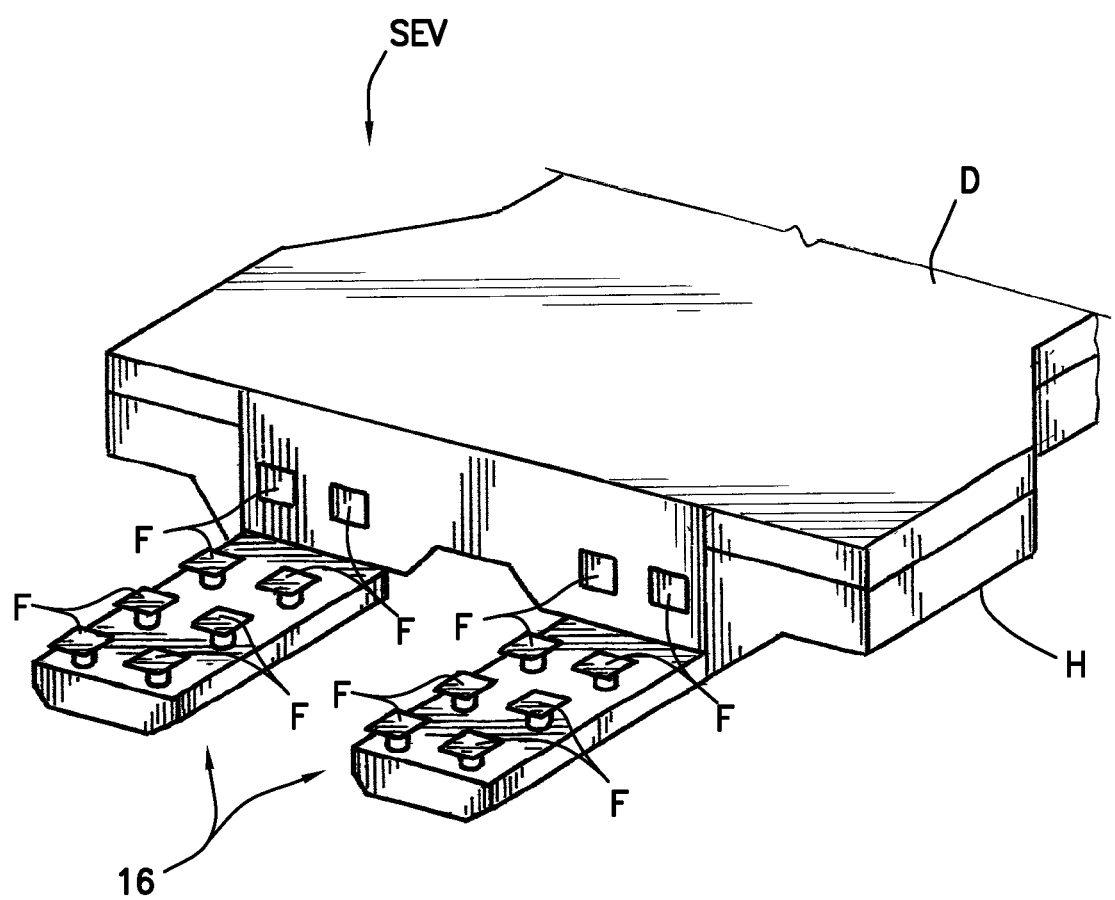
FIG. 18 is a perspective view of a fixed embodiment of a rack structure relative to a self-elevating vessel.

System Components:
(1) Rack structure—Plated, L-shaped open truss rack structures 14, supported guide systems and plated bearing surfaces. It is contemplated that the open truss rack structure 14 system will be fitted with fenders F, such as fabricated with reinforced elastomer, capable of withstanding impact loads from a feeder transport vessel and its cargo and/or wind turbine components, as described in detail above.
(2) Deployment—The vertically slidable open truss rack structure 14 system may be deployed and stowed by a number of means. For example, use of the vessel's crane LD or use of a rack and pinion system (see FIGS. 16 and 17), flooding and de-ballasting are contemplated. As best shown in FIGS. 16 and 17, while four gearboxes on each rack structure (eight total) are illustrated to raise the rack structures up and down, one or more gearboxes could be used to provide the desired raising and lowering function on each rack structure. While the open truss rack structure 14 is illustrated on the self-elevating vessel SEV transom, the open truss rack structure 14 is also contemplated to be interengaged on the self-elevating vessel SEV port, starboard or bow.
(3) Barge Securing—It is further contemplated that the feeder transport vessel B will be secured to the self-elevating vessel SEV's transom (or any other desired side) using multiple winch W and line C systems or other conventional alternate means LC as described in detail above. The line handling winches W can be obtained from Smith Bergen Marine, Inc. of Seattle, Washington.

Method of Use:

In summary, a method for use with a self-elevating vessel SEV supported on a seabed SB configured for elevating above a sea surface SS is disclosed for offshore installation of cargo and/or components, such as energy components. Once at the predetermined location, and the self-elevating vessel SEV is elevated to create an air gap AG, the open truss rack structure 14 system slidably moves vertically relative to the self-elevating vessel SEV from a stowed position to a deployed position. When the rack structure 14 system is in the stowed position, the rack structure 14 system provides a greater clearance with the seabed than when the rack structure 14 system is in said deployed position. Upon raising the open truss rack structure 14 system above the sea surface SS with the self-elevating vessel SEV jacking system including its legs L1, L2, 13 and L4 relative motion or movement between the self-elevating vessel SEV and the rack structure 14 system is eliminated. This elimination of relative motion or movement provides for safer moving of the cargo and/or components supported by the open truss rack structure 14 system in its deployed position with a lifting device LD on the self-elevating vessel SEV for assembling and installation of the wind components at sea S.

While the present invention has been illustrated with a single feeder transport vessel for installation of cargo and/or components, such as energy components, particularly, wind turbine components, it is contemplated that a plurality of feeder transport vessels B could be used to provide a continuous supply of cargo and/or components to one predetermined location or to different predetermined locations.

Also, while the present invention has been illustrated for installation of cargo and/or components, it is contemplated that the disclosed systems could be used in reversing the method or steps for decommissioning, deinstallation, removal, repair of wind turbine systems from the sea.

Fixed Rack Structure Embodiment

Figure 19:
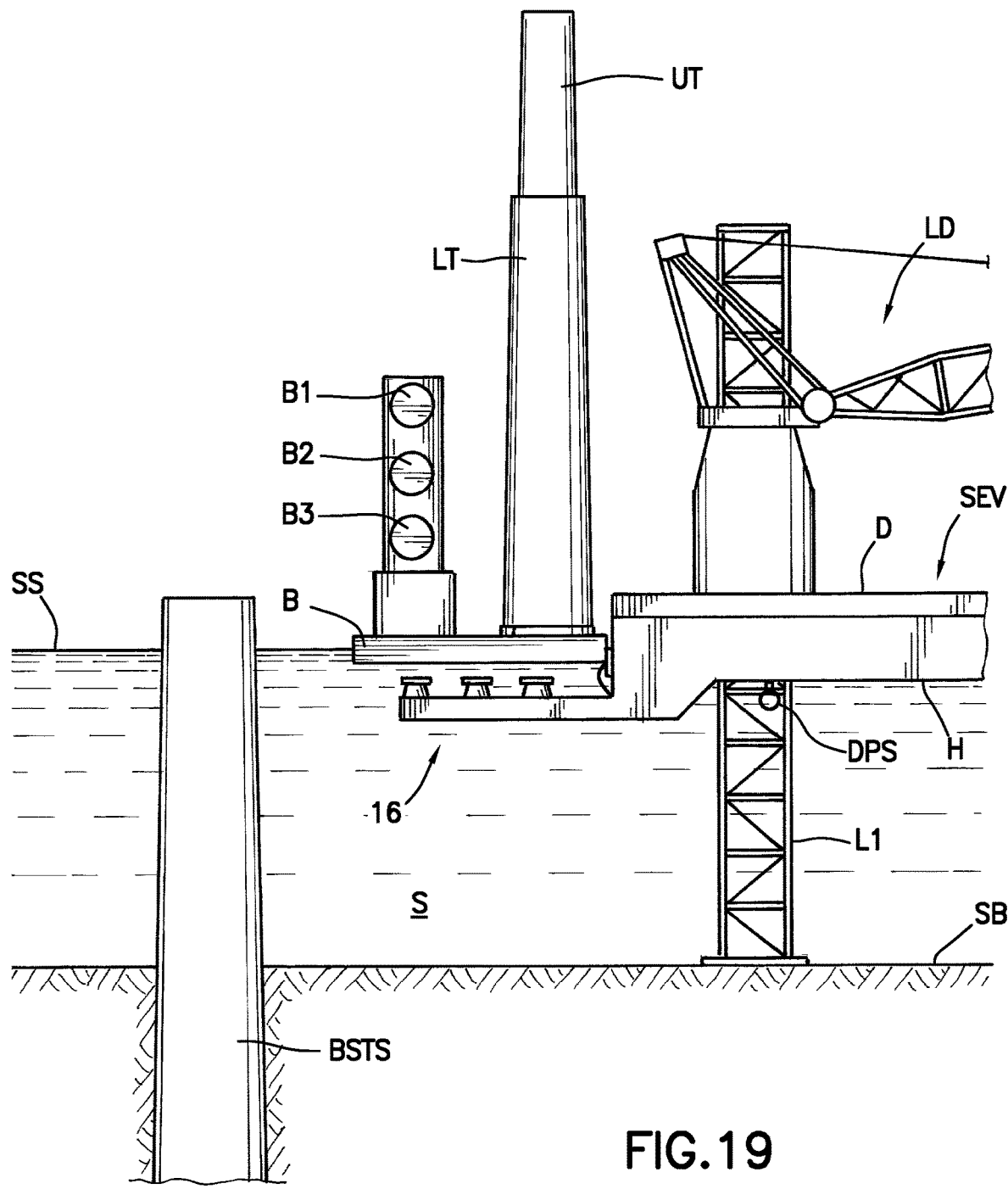
FIG. 19 is a side elevational view of the fixed embodiment of FIG. 18 with the feeder transport vessel, such as a barge, positioned above the rack structure fixed with the self-elevating vessel with the feeder transport vessel is floating on the sea surface.
Figure 20:
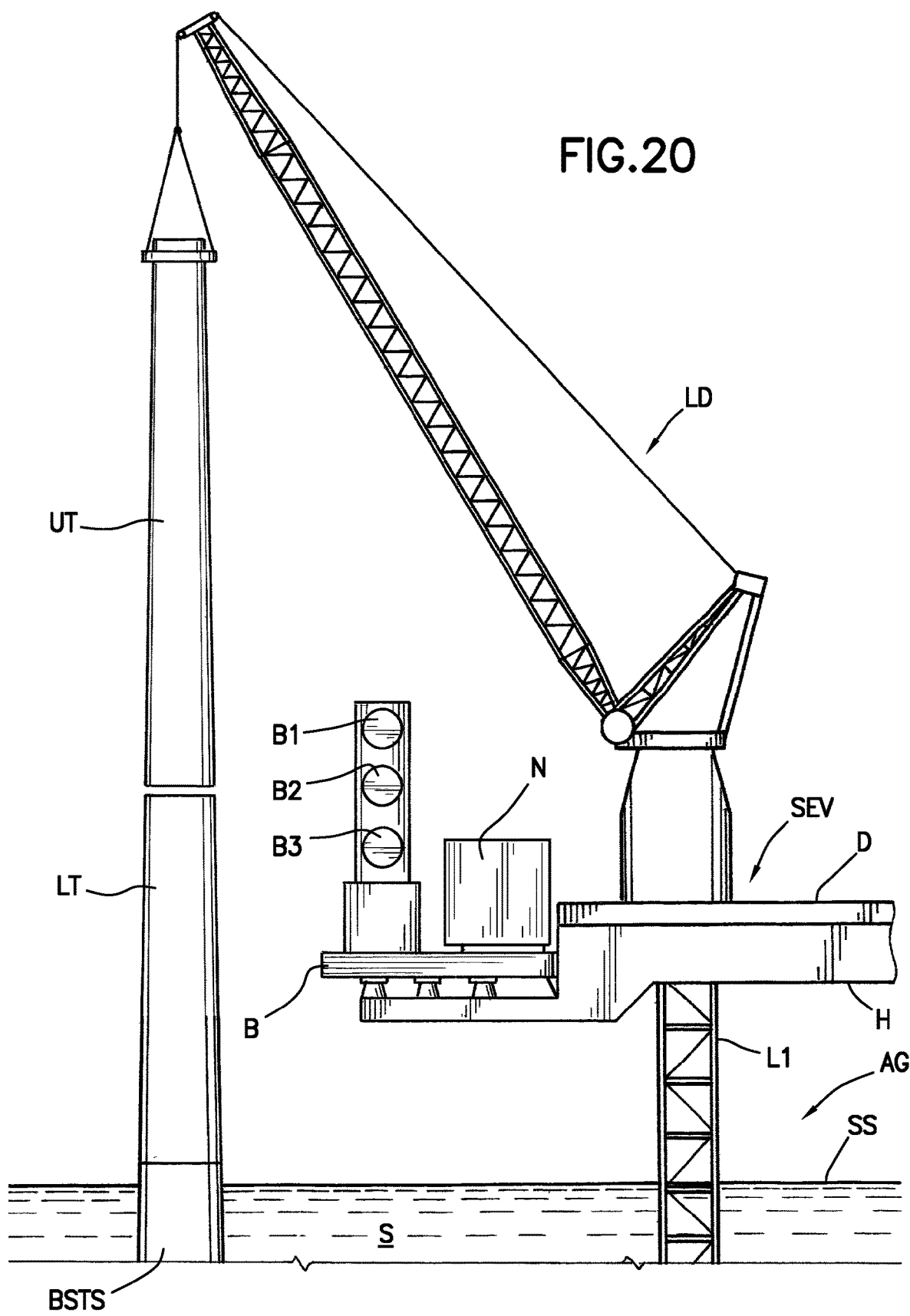
FIG. 20 is a side elevational view of the fixed embodiment of FIG. 18 with the feeder transport vessel, such as a barge, received on the rack structure with the self-elevating vessel elevated higher than as illustrated in FIG. 19 so that the feeder transport vessel is above the sea surface, FIG. 20 further illustrates a self-elevating vessel lifting device, such crane, installing the wind turbine components from the feeder transport vessel after relative movement fixed between the vessels is eliminated.
Figure 21:
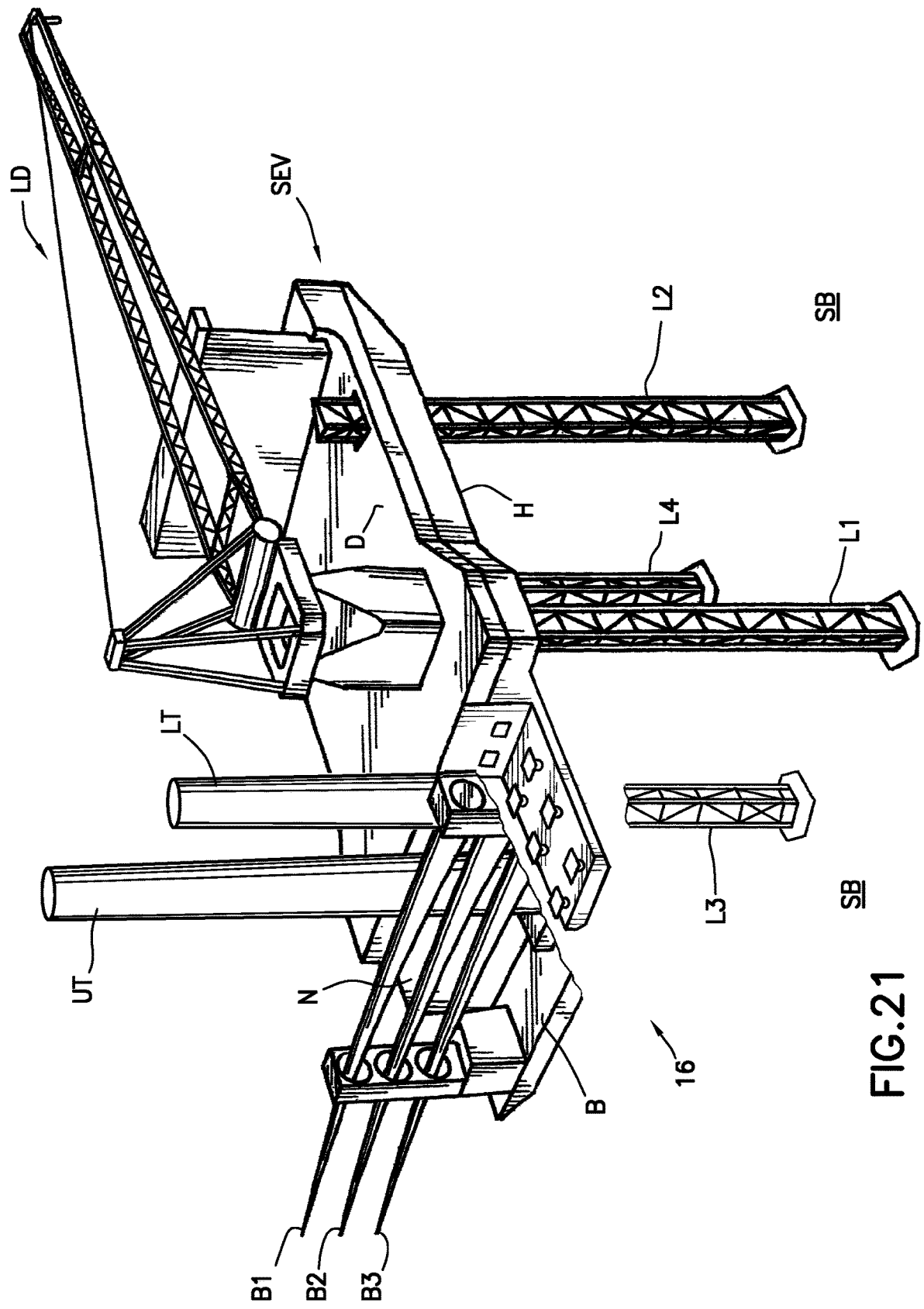
FIG. 21 is a perspective view of the fixed embodiment of FIGS. 18 to 20 better illustrating the self-elevating vessel with the fixed rack structure and the feeder transport vessel, such as a barge, thereon with the cargo and/or wind turbine components, illustrated with a cut away, raised above the sea surface using the self-elevating vessel supported on a seabed.

Yet another embodiment of a system and method for a rack structure system for a feeder transport vessel adapted for use with an offshore self-elevating vessel is shown in FIGS. 18 to 21. This fixed shelf, dock or rack embodiment also delivers a safer, efficient and reliable method of supplying, resupplying and/or removing energy components to an offshore location. A large plated, fork-type horizontal structure 16 is fixed to the transom of a relatively small, purpose-built self-elevating vessel SEV (FIGS. 19 to 21). While the rack structure 16 is illustrated on the self-elevating vessel SEV's transom, the rack structure 16 is also contemplated to be interengaged on the self-elevating vessel SEV's port, starboard or bow. This fixed rack structure 16 also serves as a rack for a feeder transport vessel, such as an ocean or sea barge or boat B. A barge B, with its cargo and/or components, can be floated over the rack structure 16 and secured to the transom while the deck D of the self-elevating vessel is above the sea surface SS, as best shown in FIG. 19. Once secured, with the systems and methods described above, the self-elevating vessel SEV will use its jacking system including the legs L1, L2, L3 and L4 to raise the barge B and its cargo and/or components above the sea surface SS for operations (FIG. 20). From this position, as described above, a lifting device LD, such as a pedestal mounted crane, can be used to install the energy components directly from the barge B onto a pre-installed bottom supported tower section BSTS extending from seabed SB supported foundation (FIG. 19). Once energy components are installed, the self-elevating vessel SEV will jack down so that the barge B is floating, and the barge B will be removed under its own DPS or by a tow/tug boat and, if desired, or replaced by another feeder transport vessel B. This system provides a safer, streamlined method for an offshore feeder transport vessel.

Systems Components:
(1) Rack structure—Plated, fork horizontal rack structure 16, permanently and/or fixedly attached to the transom of the self-elevating vessel SEV. It is contemplated that the rack structure 16 will be fitted with horizontal facing and vertical facing fenders F, such as fabricated with reinforced elastomer, capable of withstanding impact loads from a feeder transport vessel, such as a barge B, and its cargo or components as described above.
(2) Barge Securing—The feeder transport vessel B will be secured to the self-elevating vessel SEV's transom using multiple winch W and line C systems or other conventional alternate means LC, as described above.

Method of Use:

In summary, a method for use of a self-elevating vessel SEV supported on a seabed SB configured for elevating above a sea surface SS is disclosed for offshore installation of cargo and/or components, such as energy components. The L-shaped horizontal rack structure 16 is fixedly interengaged with the self-elevating vessel SEV. Upon raising the rack structure 16 above the sea surface SS when the self-elevating vessel hull H is also elevated above the sea surface SS relative motion or movement between the self-elevating vessel SEV and a feeder transport vessel B on the rack structure 16 along with other forces, such as wave action, are advantageously eliminated. This elimination of relative motion or movement provides for safer moving of the energy components on the feeder transport vessel B supported by the rack structure 16 in the deployed position with a lifting device LD on the self-elevating vessel SEV for installation in the sea S.

While the present invention has been illustrated for a single feeder transport vessel for installation of cargo and/or components, such as energy components, particularly, wind turbine components, it is contemplated that a plurality of feeder transport vessels could be used to supply and resupply cargo and/or components to one predetermined location or to different predetermined locations.

Also, while the present invention has been illustrated for installation of cargo and/or components, it is contemplated that the disclosed systems could be used in reversing the method or steps for decommissioning, deinstallation, removal, repair of systems from the sea and/or the self-elevating vessel to the feeder transport vessel on the rack structure.

Figure 23:
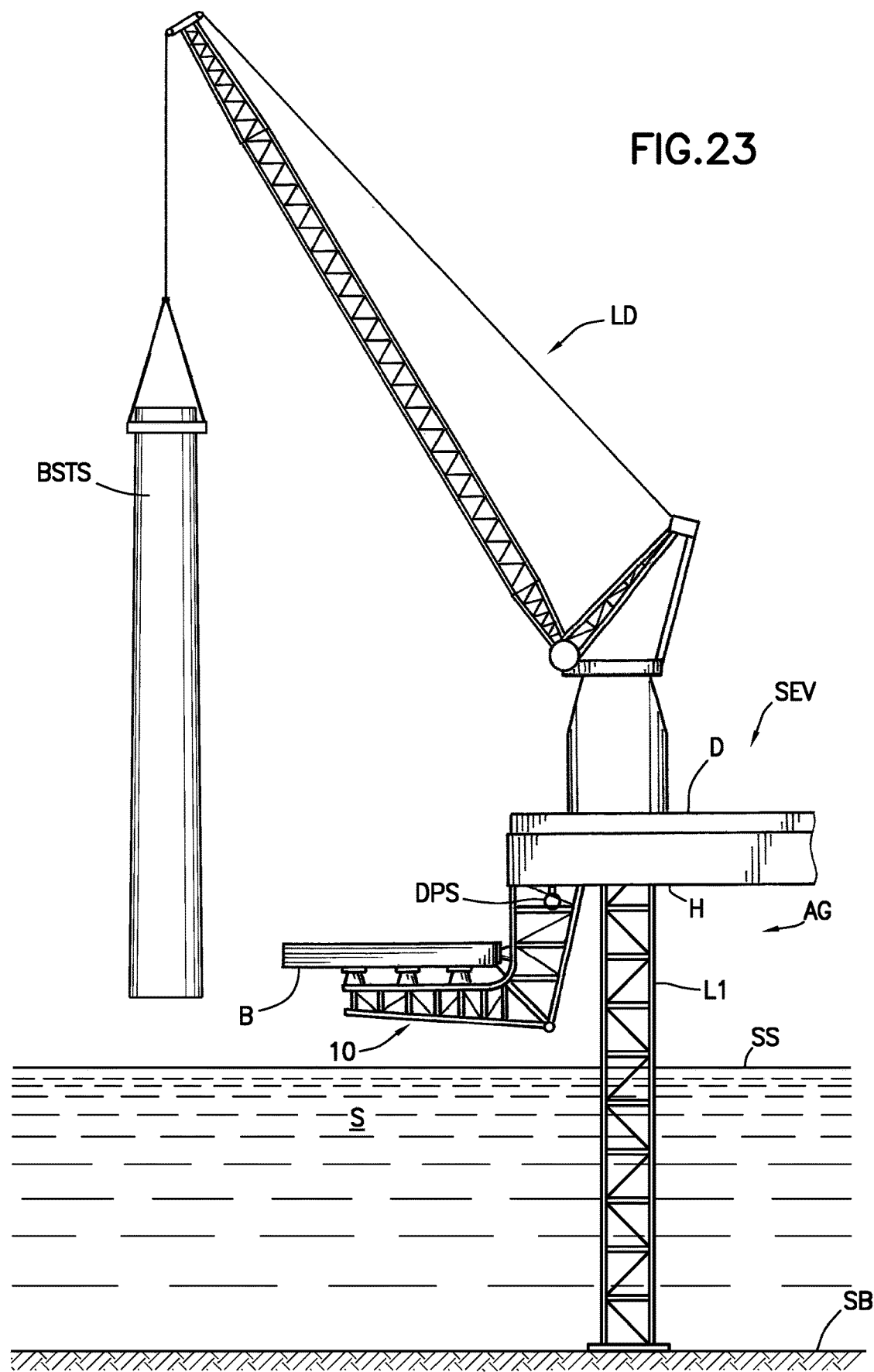
FIG. 23 is a side elevational view of the feeder transport vessel, such as a barge, supported by the rack structure in the deployed position and the self-elevating vessel elevated so that the feeder transport vessel, such as a barge, is above the sea surface, FIG. 23 further illustrates a self-elevating vessel lifting device, such as a crane, installing a bottom supported column or tower section to the seabed from the feeder transport vessel after relative movement between the vessels is eliminated.

Assembly and Installation of a Bottom Supported Tower Section BSTS and, if Desired, a Seabed Foundation Therefore in the Seabed As best shown in FIG. 23, it is contemplated that a feeder transport vessel, or barge B, could transport cargo and components for assembly and installation of a bottom supported tower or column section BSTS and, if desired, a seabed foundation therefore in the seabed SB.

It is contemplated, that the barge B with the bottom supported tower section BSTS would transport the tower section BSTS and, if desired, a seabed foundation therefore independently of the other typical wind turbine components i.e., nacelle, lower and upper towers and blades. It is also contemplated that the tower section BSTS and its foundation could be delivered and installed in one piece from the barge B. The barge B would be raised, as described herein, to eliminate relative motion or movement between the tower section BSTS and, if desired, a seabed foundation therefore and the self-elevating vessel SEV for safer assembly and installation in the seabed SB, including when the tower section BSTS and/or its foundation are lifted by the lifting device LD.

The lifting device LD would lift the tower section BSTS, as best shown in FIG. 23, from the barge B and move it above a predetermined location for assembly and installation, as best shown in FIGS. 5 to 8A, 19 and 20. The tower section BSTS can then be fixed with the seabed SB using known traditional equipment and installation procedures and methods, including the below proposals in the US. patents and U.S. Patent Publications. The assembly and/or installation equipment could be transported to the predetermined location on the barge B or could be located on the self-elevating vessel SEV.

Some known equipment and installation procedures and methods are proposed in the below U.S. patents and U.S. Patent Publications.

U.S. Pat. No. 7,281,902 (VESTAS WIND SYSTEMS A/S) proposes a method of mounting a wind turbine at a mounting location comprising the steps of providing a foundation body and pre-fitted upper attachment means vibrating at least a part of the foundation into the earth by transferring of vibrations into the structure of the foundation, mounting at least a part of said wind turbine to said upper attachment means (12) of said foundation. Large scale wind turbines, especially offshore wind turbines, are proposed to be transported and mounted at the site.

U.S. Pat. No. 8,015,865 (REED & REED, INC.) proposes a load measuring system for measuring the loads on a foundation for wind turbines. A load measuring device is proposed to be mounted on a rock anchor pad for a turbine and measures the loads on the anchor. Signals from the load measuring device are proposed to transmitted to a remote location. The load measuring device is installed on selected rock anchor pads, distributed evenly about the foundation pad. The signals from the load measuring are transmitted to a control station at a remote location, thereby enabling continuous monitoring of the loading conditions on the rock anchors. The signals from a plurality of load measuring systems proposed to be transmitted to the control station allow monitoring of a group of wind turbine foundation pads at a single location.

U.S. Pat. No. 9,567,721 (DCNS) proposes an offshore wind turbine foundation comprising a platform carrying a support for the wind turbine tower in its central region, a plurality of leg guides in its peripheral region; and a plurality of legs, each of which may be movable between a raised position for transport and lowered positions for resting on the seabed.

U.S. Pat. No. 9,605,401 (TECNICA Y PROYECTOS SA) proposes a gravity-based foundation system for offshore wind turbine installation that comprises three floating concrete bases built with self-floating concrete caissons, equipped with valves for filling them with water and emptying the water out enabling their ballasting and anchoring at their final location. A metal structure which connects the floating concrete bases by means of a connecting element to the wind turbine tower, and a metal element connects the floating concrete bases to the wind turbine. A method of installation of the gravity-based foundation system is proposed.

U.S. Pat. No. 9,663,916 (Vallourec Deutschland GmbH) proposes a foundation structure of an offshore wind turbine comprising at least one foundation element that can be anchored to the seabed without a gravity foundation and without a floating foundation and a support structure fastened thereto for fixing the offshore wind turbine. The foundation element, proposed to be a pile that can be inserted into the seabed by means of drilling and/or by means of vibratory driving, can be fixed in the seabed by means of an organic and/or inorganic material, and is oriented at an angle from a vertical on the seabed. A method of installing the foundation structure on a seabed is proposed to include anchoring the coupling element by means of piles inserted into the seabed and then connecting the support structure to the coupling element.

U.S. Pat. No. 9,670,909 (Wobben Properties GmbH) proposes a wind energy plant foundation with a plurality of ready-made concrete foundation segments. The foundation segments to proposed to have a plurality of first and second sheaths which serve to receive tension wires for bracing the foundation segments.

U.S. Pat. No. 10,253,475 (Zhejiang Hua Yun Offshore Engineering & Technology Service Co Ltd; MingYang Smart Energy Group Co Ltd) proposes a construction device for an offshore wind turbine foundation. The construction device is proposed to comprise an offshore wind turbine foundation (1), a pile casing (2) and a sleeve (3). The pile casing (2) is used for the installation of a steel pile (4) and arranged at the bottom of the offshore wind turbine foundation (1). The lower end of the sleeve (3) is detachably connected with the upper end of the pile casing (2). A construction method for an offshore wind turbine foundation with piling performed later is also proposed.

U.S. Pat. No. 10,626,573 and U.S. Patent Publication No. 20160169209A1 (Wobben Properties GmbH) proposes a wind energy plant with a foundation base and a tower which is placed on the foundation base. The foundation base is proposed to have a foundation plate below ground level and a foundation plinth on the foundation plate above ground level. On the foundation plinth a tension cord connector is proposed with a plurality of bores for receiving tension cords. The tension cords are tensioned on an underneath side of the connector by means of a tension cord head. The foundation plate and the foundation plinth are cast in one piece from site-mixed concrete.

U.S. Pat. Nos. 10,851,763 and 10,968,894 and U.S. Patent Publication No. 20210190043A1 (Tetra Tech Inc) proposes a wind turbine foundation and method for making a wind turbine foundation. The wind turbine foundation is proposed to preferably include a core member including a substantially cylindrically-shaped main body, a first outer flange extending out from the main body along an upper section of the core member, and a second outer flange extending out from the main body along a lower section of the core member, and a plurality of radial girders connected to the first outer flange and the second outer flange and radiating out from the core member.

U.S. Pat. No. 10,941,536 (Acciona Windpower SA) proposes a wind turbine foundation (1) comprising an annular base plate (2) comprising a supporting surface (3) and defining a central hollow (4) by at least an inner lateral surface (6). The central hollow (4) is further proposed to comprise a lower surface (5) arranged at a level lower than a level of the supporting surface (3). The central hollow (4) has a dimension (D), defined by the distance between at least an inner upper surface (10) and the lower surface (5), established such as to allocate additional equipment between both surfaces. A method of constructing the wind turbine foundation (1) is proposed.

U.S. Pat. No. 11,105,062 (General Electric Renovables Espana SL) proposes a method for retrofitting a wind turbine foundation. The foundation is proposed to comprise a first substantially elongated pile (31) in the ground. The method is proposed to comprise: arranging a lower end of an elongated channel (41) of a second substantially elongated pile (40) around the first pile (31), wherein the elongated channel (41) extends substantially along a longitudinal direction of the second pile (40), wherein the channel (41) is configured to receive at least a portion of the first pile. The method is proposed to further comprise lowering the second pile (40) such that the elongated channel (41) surrounds at least a portion of the first pile (31). The second pile (40) is then driven into the ground (35).

U.S. Pat. No. 11,236,727 and U.S. Patent Publication No. 20220112881A1 (Vestas Wind Systems AS) a method of forming a wind turbine foundation that includes providing an anchor cage in an excavation pit, the anchor cage including an upper flange, a lower flange, and a plurality of anchor bolts extending therebetween. A first cementitious material is proposed to be directed into the excavation pit so that the anchor cage becomes at least partially embedded in the material, which is allowed to cure to form a rigid body. A connecting element is proposed to be selectively engaged with the upper flange and an actuating element is positioned in operative relation with the connecting element, the connecting and actuating elements positioned in non-contact relation with the anchor bolts. The actuating element is actuated relative to the connecting element to raise the upper flange from the rigid body into a leveled position. A second cementitious material is directed into a space beneath the raised upper flange and is allowed to cure to form a support layer.

U.S. Patent Publication No. 20130298485A1 (General Electric Co) proposes a system for supporting a foundation mounting part connected to a tower of a wind turbine extending upward from a foundation and coupled to the foundation by the foundation mounting part. The system is proposed to include a first support block and a second support block. The first support block is positioned adjacent a first portion of the foundation mounting part. The second support block is proposed to be slidably coupled to the first support block and at least a portion of the second support block is proposed to be positioned between the first support block and the second support block. The second support block is configured to exert force on the first support block when displaced laterally with respect to a first axis coincident with a longitudinal axis of the tower.

U.S. Patent Publication No. 20130302096A1 (General Electric Renovables Espana SL) proposes a wind turbine foundation comprising at least one substantially elongated pin associated with a wind turbine tower and at least one corresponding substantially elongated pile foundation to be inserted into a surface and adapted for receiving at least a portion of the length of the pin when in use. The pin is proposed to comprise an inserting end arranged opposite to a connecting end associated with the wind turbine tower and a stopping element is arranged inside the pile on a plane substantially transversal to a longitudinal axis of the pile. The stopping element is proposed to receive said inserting end such that when the pin is inserted into the pile the inserting end is fitted in the stopping element.

U.S. Patent Publication No. 20150082720A1 (GE Renewable Technologies Wind BV) proposes at least one substantially elongated pin associated with a wind turbine tower and at least one corresponding substantially elongated pile to be inserted into a surface and adapted for receiving at least one portion of the pin. A chamber is proposed between the pin and the pile for receiving grout. At least one of the pin and the pile is proposed to provide connecting plates extending inside the grouting chamber and with holes through which the grout passes. The connecting plates is proposed to extend radially inside the grouting chamber, aligned or not to each other or with the center of the pin or the pile.

U.S. Patent Publication No. 20180195250A1 (Charles W. Nelson) proposes an offshore wind turbine support system and method of installation, where the support system is comprised of an upper frame lattice structure, and a lower foundation structure that has a plurality of supports embedded in the sea floor. Sleeves of varying length are proposed to protrude from the supports, such that the top of each sleeve in each foundation structure is about at the same distance below sea level as the top of each sleeve in all other foundation structures of the system.

U.S. Patent Publication No. 20220074160 (Zhejiang University ZJU) proposes a pile-cylinder-truss composite offshore wind turbine foundation. The pile-cylinder-truss composite offshore wind turbine foundation is proposed to include a truss structure, a suction cylinder and a pile foundation. The suction cylinder is connected to a bottom portion of the truss structure, and an embedded sleeve for mounting the pile foundation is proposed to be provided on the suction cylinder. The embedded sleeve is located inside, at an edge of or outside the suction cylinder. A construction process of the pile-cylinder-truss composite offshore wind turbine foundation is proposed.

U.S. Pat. Nos. 7,281,902B2; 7,963,740B2; 8,015,865B2; 9,567,721B2; 9,605,401B2; 9,663,916B2; 9,670,90932; 10,253,475B2; 10,626,573B2; 10,851,763B2; 10,941,536B2; 10,968,894B2; 11,105,062B2 and 11,236,727B2; and U.S. Patent Publication Nos. 2013/0298485A1; 2013/0302096A1; 2015/0082720A1; 2016/0169209A1; 2018/0195250A1; 2020/0022341A1; 2021/0190043A1; 2022/0074160A1 and 2022/0112881A1 are incorporated by reference herein for all purposes in their entirety.

U.S. Pat. Nos. 7,281,902 and 11,236,727 and U.S. Patent Publication No. 20220112881A1 are owned by VESTAS WIND SYSTEMS A/S of Denmark, who has a U.S. subsidiary, VESTAS NORTH AMERICA headquartered in Portland, Oregon.

The foregoing disclosure and description of the present invention are illustrative and explanatory thereof, and various changes in the details of the illustrated apparatus and construction and the method of operation may be made without department from the spirit of the present invention. Further, the above and other objects, features and advantages of the present invention should become even more readily apparent to those skilled in the art upon a reading of the detailed description in conjunction with the drawings wherein there is shown and described multiple embodiments of the present invention. Furthermore, it will be apparent to those skilled in the art that various changes may be made without departing from the scope of the present invention and the present invention is not be considered limited to what is shown and described in the specification and drawings.

We claim:

1. System for use with a self-elevating vessel having a hull supportable on a seabed and the hull configured for being elevated above a sea surface when supported on the seabed for offshore installation of energy components, comprising:
   a structure interengaged with the self-elevating vessel hull and configured for moving between a stowed position and a deployed position, wherein when said structure is in said stowed position said structure is configured to provide a greater clearance with the seabed than when said structure is in said deployed position, and wherein the energy components are moved to said structure when said structure is in said deployed position and after the self-elevating vessel hull is supported on the seabed, and
   a lifting device configured with the self-elevating vessel for moving the energy components supported by said structure in said deployed position for offshore installation,
   wherein when the self-elevating vessel hull is elevated above the sea surface thereby raising said deployed structure and the energy components thereon above the sea surface relative motion between the vessel and the energy components supported on said structure is eliminated.

2. The system of claim 1, wherein said structure is interengaged with the self-elevating vessel so that said structure is configured to pivot between said stowed position and said deployed position.

3. The system of claim 2, wherein said structure comprises an L-shaped open truss to reduce drag during the self-elevating vessel transit in the sea.

4. The system of claim 1, wherein said structure is interengaged with the self-elevating vessel so that said structure is configured to move vertically between said stowed position and said deployed position, wherein the energy components are moved to said structure after the self-elevating vessel hull is elevated above the sea surface.

5. The system of claim 4, wherein said structure comprises an L-shaped member vertically slidable relative to the self-elevating vessel.

6. The system of claim 5, comprising,
wherein said L-shaped member is an open truss, and
rack and pinion means configured with said L-shaped open truss for moving said structure between said deployed position and said stowed position.

7. The system of claim 1, further comprising a transport vessel configured for transporting the energy components over the sea surface and to be received on said structure, wherein before the self-elevating vessel raises said structure and said transport vessel to eliminate relative motion between the self-elevating vessel and said transport vessel, said transport vessel is floating on the sea surface above said structure.

8. The system of claim 1, further comprising a transport vessel configured for transporting the energy components over the sea surface, wherein a plurality of fenders are configured with said structure to reduce impact loading between said transport vessel and the said structure.

9. The system of claim 1, wherein said structure is configured to be retrofitted with the self-elevating vessel.

10. The system of claim 1, wherein said structure is configured to be constructed with a newbuild self-elevating vessel.

11. The system of claim 1, wherein the self-elevating vessel is a jack-up having a hull and a plurality of legs configured for contact with the seabed to support the jack-up, wherein before said structure is moved from said stowed position to said deployed position the jack-up hull is elevated above the sea surface to create an air gap.

12. The system of claim 11, further comprising a transport vessel configured for transporting the energy components, wherein after the self-elevating vessel is elevated to create said air gap and after said structure is moved from said stowed position to said deployed position, a portion of said structure is submerged below the sea surface in the deployed position to allow the transport vessel to float above the submerged portion of said structure.

13. The system of claim 11, wherein the self-elevating vessel further comprises a dynamic positioning system for positioning the self-elevating vessel before said plurality of legs contact the seabed.

14. The system of claim 1, further comprising a transport vessel configured for transporting the energy components over the sea surface, wherein said self-elevating vessel lifting device is configured for moving the energy components from said transport vessel for installation in the sea.

15. System for use with a self-elevating vessel having a hull supportable on a seabed and the hull configured for being elevated above a sea surface when supported on the seabed for offshore installation of energy components, comprising:
said energy components comprise wind turbine components,
a transport vessel configured for transporting said wind turbine components over the sea surface, and
a structure interengaged with the self-elevating vessel and configured for moving between a stowed position and a deployed position, wherein when said structure is in said deployed position said structure is configured to receive said transport vessel and wherein when said structure is in said stowed position said structure is configured to provide a greater clearance with the seabed than when said structure is in said deployed position, and wherein the wind turbine components are moved to said structure when said structure is in said deployed position and after the self-elevating vessel hull is supported on the seabed,
wherein when said transport vessel is floating on the sea surface above said deployed structure, the self-elevating vessel hull is elevated above the sea surface thereby raising said transport vessel above the sea surface so that relative motion between the self-elevating vessel and wind turbine components on said transport vessel is eliminated.

16. The system of claim 15, wherein said structure is interengaged with the self-elevating vessel so that said structure is configured to pivot between said stowed position and said deployed position.

17. The system of claim 16, wherein said structure comprises an L-shaped open truss to reduce drag during the self-elevating vessel transit in the sea.

18. The system of claim 15, wherein said structure is interengaged with the self-elevating vessel so that said structure is configured to move vertically between said stowed position and said deployed position.

19. The system of claim 18, wherein said structure comprises an L-shaped member vertically slidable relative to the self-elevating vessel.

20. The system of claim 19, comprising,
wherein said L-shaped member is an open truss, and
rack and pinion means configured with said L-shaped open truss for moving said structure between said deployed position and said stowed position.

21. The system of claim 15, wherein before the self-elevating vessel raises said transport vessel on said structure above the sea surface, said self-elevating vessel is elevated above the sea surface to create an air gap.

22. The system of claim 15, wherein a plurality of fenders are configured with said structure to reduce impact loading between said transport vessel and said structure.

23. The system of claim 15, wherein said structure is configured to be retrofitted with the self-elevating vessel.

24. The system of claim 15, wherein said structure is configured to be constructed with a newbuild self-elevating vessel.

25. The system of claim 15, wherein the self-elevating vessel is a jack-up having a hull and a plurality of legs configured for contact with the seabed to support the jack-up, wherein before said structure is moved from said stowed position to said deployed position the jack-up hull is elevated above the sea surface to create an air gap.

26. The system of claim 25, wherein after said jack-up is elevated to create said air gap and after said structure is moved from said stowed position to said deployed position, a portion of said structure is submerged below the sea surface in the deployed position to allow the transport vessel to float above the submerged portion of said structure.

27. The system of claim 15, wherein the self-elevating vessel further comprises a lifting device configured for moving said wind turbine components from said transport vessel for installation in the sea.

28. The system of claim 15, wherein the self-elevating vessel further comprises a dynamic positioning system for positioning the self-elevating vessel for installation of said wind turbine components.

29. Method for use of a self-elevating vessel having a hull supportable on a seabed and the hull configured for being elevated above a sea surface when supported on the seabed for offshore installation of wind turbine components in the sea, comprising:
 elevating the self-elevating vessel hull above the sea surface to create an air gap,
 after said elevating step, moving a structure interengaged with the self-elevating vessel from a stowed position to a deployed position, wherein when said structure is in said stowed position said structure is configured to provide a greater clearance with the seabed than when said structure is in said deployed position and wherein when said structure is in the deployed position, a portion of said structure is submerged below the sea surface,
 after said moving step, raising said structure above the sea surface while elevating the self-elevating vessel above the sea surface to eliminate relative motion between the self-elevating vessel and said structure, and
 moving the wind turbine components supported by said structure in said deployed position with a lifting device on the self-elevating vessel for installation in the sea.

30. The method of claim 29, further comprising the step of:
 pivoting said structure relative to the self-elevating vessel from said stowed position to said deployed position.

31. The method of claim 30, wherein said structure comprises an L-shaped open truss.

32. The method of claim 29, further comprising the step of:
 vertically moving said structure relative to the self-elevating vessel from said stowed position to said deployed position.

33. The method of claim 32, wherein said structure comprises an L-shaped member vertically slidable relative to the self-elevating vessel, wherein said L-shaped member is an open truss.

34. The method of claim 29, further comprising a transport vessel and the step of:
 transporting the wind turbine components over the sea surface with said transport vessel, wherein before the raising step, said transport vessel is floated above a portion of said structure, and
 after the raising step, the self-elevating vessel is elevated using the self-elevating vessel legs in contact with the seabed to raise the structure and the wind components above the sea surface.

35. The method of claim 29, further comprising a transport vessel and the step of:
 transporting the wind turbine components over the sea surface with said transport vessel, wherein a plurality of fenders are configured with said structure to reduce impact loading between said transport vessel and said structure.

36. The method of claim 29, further comprising the step of:
 retrofitting said structure with the self-elevating vessel.

37. The method of claim 29, further comprising the step of:
 constructing said structure with a newbuild self-elevating vessel.

38. The method of claim 29, further comprising the step of:
 elevating the self-elevating vessel using a plurality of legs in contact with the seabed to support the self-elevating vessel.

39. The method of claim 29, further comprising a transport vessel and a lifting device on the self-elevating vessel and the steps of:
 transporting the wind turbine components over the sea surface with said transport vessel, and
 moving the wind turbine components from said transport vessel for installation above the seabed using said self-elevating vessel lifting device.

40. The method of claim 39, further comprising the step of:
 positioning the self-elevating vessel for installation of said wind turbine components using a dynamic positioning system.

41. Method for use on a self-elevating vessel having a hull supportable on a seabed and the hull configured for being elevated above a sea surface when supported on the seabed for offshore installation of wind turbine components in the sea, comprising:
 elevating the self-elevating vessel hull above the sea surface to create an air gap,
 after said elevating step, moving a structure interengaged with the self-elevating vessel from a stowed position to a deployed position, wherein when said structure is in said stowed position said structure is configured to provide a greater clearance with the seabed than when said structure is in said deployed position and wherein when said structure is in the deployed position, a portion of said structure is submerged below the sea surface,
 transporting the wind turbine components over the sea surface with a transport vessel, wherein before the raising step, the transport vessel is floated above said structure,
 after said moving step, raising said structure and the transport vessel above the sea surface while elevating the self-elevating vessel above the sea surface to eliminate relative motion between the self-elevating vessel, said structure and the transport vessel, and
 moving the wind turbine components supported by said structure in said deployed position with a lifting device on the self-elevating vessel for installation in the sea.

42. The method of claim 41, further comprising the step of:
 elevating the self-elevating vessel using a plurality of legs in contact with the seabed to support the self-elevating vessel.

43. The method of claim 41, further comprising a lifting device on the self-elevating vessel and the step of:
 moving the wind turbine components from the transport vessel for installation above the seabed using said self-elevating vessel lifting device.

44. System for use with a self-elevating vessel having a hull and a deck supportable on a seabed and the hull configured for being elevated above a sea surface when supported on the seabed for offshore installation of a wind turbine in the sea, comprising:
- wind turbine components,
- a transport vessel having a width and a length configured for transporting said wind turbine components over the sea surface,
- an L-shaped structure fixedly interengaged with the self-elevating vessel to extend outwardly from a side between said self-elevating vessel hull and deck to support a majority of the width of said transport vessel wherein a horizontal portion of said structure is configured to be submerged below the sea surface to receive said transport vessel while the self-elevating vessel deck is above the sea surface, and
- a lifting device positioned on said self-elevating vessel deck and configured for moving said wind turbine components from said transport vessel for installation in the sea,
- wherein when the self-elevating vessel deck is elevated above the sea surface, said transport vessel is floating on the sea surface above said submerged horizontal portion of said structure, when the self-elevating vessel is elevated above the sea surface, said transport vessel is raised above the sea surface to eliminate relative motion between the self-elevating vessel and said wind turbine components in said transport vessel.

45. The system of claim 44, wherein said structure is configured to be retrofitted with the self-elevating vessel.

46. The system of claim 44, further comprising:
- a plurality of spaced apart L-shaped structures fixedly interengaged with the self-elevating vessel to extend outwardly from a side between said self-elevating vessel hull and deck to support a majority of the width of said transport vessel wherein a horizontal portion of said plurality of structures are configured to be submerged below the sea surface to receive said transport vessel while the self-elevating vessel deck is above the sea surface, wherein a plurality of fenders are configured with said plurality of structures to reduce impact loading between said transport vessel and said structures.

47. The system of claim 44, wherein the self-elevating vessel is a jack-up having a plurality of legs configured for contact with the seabed to support and elevate the self-elevating vessel.

48. System for use with a self-elevating vessel having a hull supportable on a seabed and the hull configured for being elevated above a sea surface when supported on the seabed, comprising:
- the self-elevating vessel,
- a transport vessel configured for transporting over the sea surface, and
- a vertically slidable structure fitted to a side of the self-elevating vessel and configured for moving vertically between a stowed position and a deployed position, wherein when said structure is in said deployed position said structure is configured to receive said transport vessel and wherein when said structure is in said stowed position said structure is configured to provide a greater clearance with the seabed than when said structure is in said deployed position,
- wherein when said transport vessel is floating on the sea surface above said deployed structure, the self-elevating vessel hull is in an elevated position above the sea surface, and
- wherein when said transport vessel is raised on said structure above the sea surface towards said stowed position relative motion between the self-elevating vessel and said transport vessel is eliminated.

49. The system of claim 48, wherein said structure is connectable with the self-elevating vessel so that said structure is configured to move vertically between said stowed position and said deployed position.

50. The system of claim 49, further comprising wind turbine components transported on the transport vessel, wherein said structure comprises an L-shaped member vertically slidable relative to the self-elevating vessel, and wherein the self-elevating vessel further comprises a lifting device for moving said wind turbine components from the transport vessel.

51. The system of claim 48, comprising,
- rack and pinion for moving said structure between said deployed position and said stowed position.

52. The system of claim 48, wherein said transport vessel is a transport boat, and wherein a plurality of fenders are configured with said structure to reduce impact loading between said transport boat and said structure.

53. The system of claim 48, wherein said structure is configured to be retrofitted with the self-elevating vessel.

54. The system of claim 48, wherein the self-elevating vessel is a jack-up having a hull and a plurality of legs configured for contact with the seabed to support the jack-up, wherein when the self-elevating vessel is floating on the sea surface, said stowed structure has clearance with the sea surface, and
- wherein before said structure is moved from said stowed position to said deployed position the jack-up hull is elevated above the sea surface to create an air gap.

55. The system of claim 54, wherein after said jack-up is elevated to create said air gap and after said structure is moved from said stowed position to said deployed position, a portion of said structure is submerged below the sea surface in the deployed position to allow the transport vessel to float above the submerged portion of said structure, and wherein the hull is raised further relative to the plurality of legs to raise said structure further above the sea surface.

56. Method for use of a self-elevating vessel having a hull supportable on a seabed and the hull configured for being elevated above a sea surface when supported on the seabed, comprising:
- elevating the self-elevating vessel hull above the sea surface to create an air gap,
- after said elevating step, vertically moving a vertically slidable structure fitted to a side of the self-elevating vessel from a stowed position to a deployed position, wherein when said structure is in said stowed position said structure is configured to provide a greater clearance with the seabed than when said structure is in said deployed position and wherein when said structure is in the deployed position, a portion of said structure is submerged below the sea surface for floating a transport vessel thereon, and
- after said moving step, raising said structure above the sea surface to eliminate relative motion between the self-elevating vessel and said transport vessel.

57. The method of claim 56, wherein said structure comprises an L-shaped member that is vertically slidable relative to the self-elevating vessel, and wherein the method further comprises the step of:
- vertically sliding said structure relative to the self-elevating vessel from said stowed position to said deployed position.

58. The method of claim 56, further comprising the step of:
 floating said transport vessel above said submerged portion of said structure, and
 after the raising step, the self-elevating vessel hull is elevated further using the self-elevating vessel legs in contact with the seabed to further raise the structure and said transport vessel above the sea surface.

59. The method of claim 56, wherein said transport vessel is a transport boat, wherein a plurality of fenders are configured with said structure to reduce impact loading between said transport boat and said structure.

60. The method of claim 56, further comprising the step of:
 retrofitting said structure with the self-elevating vessel.

61. The method of claim 56, wherein when the self-elevating vessel hull is floating on the sea surface, said stowed structure has a clearance with the sea surface, the method further comprising the step of:
 elevating the self-elevating vessel hull using a plurality of legs in contact with the seabed to support the self-elevating vessel and before said structure is moved from said stowed position to said deployed position the hull is elevated above the sea surface to create an air gap.

62. The method of claim 56, further comprising a lifting device on the self-elevating vessel and the steps of:
 transporting wind turbine components over the sea surface with said transport vessel, and
 moving the wind turbine components from said transport vessel for installation above the seabed using said self-elevating vessel lifting device.

63. System for use with a self-elevating vessel having a hull supportable on a seabed and the hull configured for being elevated above a sea surface when supported on the seabed for offshore installation of energy components, comprising:
 a structure interengaged with the self-elevating vessel hull and configured for pivoting between a stowed position and a deployed position, wherein when said structure is in said stowed position said structure is configured to provide a greater clearance with the seabed than when said structure is in said deployed position, and
 a lifting device configured with the self-elevating vessel for moving the energy components supported by said structure in said deployed position for offshore installation,
 wherein when the self-elevating vessel hull is elevated above the sea surface thereby raising said deployed structure and the energy components thereon above the sea surface relative motion between the vessel and the energy components supported on said structure is eliminated.

64. The system of claim 63, wherein said structure comprises an L-shaped open truss to reduce drag during the self-elevating vessel transit in the sea.

\* \* \* \* \*